United States Patent [19]

Kuseski

[11] 4,213,694

[45] Jul. 22, 1980

[54] COPY PRODUCTION MACHINES

[75] Inventor: Roger E. Kuseski, Longmont, Colo.

[73] Assignee: International Business Machines Corporation, Armonk, N.Y.

[21] Appl. No.: 802,095

[22] Filed: May 31, 1977

Related U.S. Application Data

[60] Division of Ser. No. 768,651, Feb. 14, 1977, which is a continuation-in-part of Ser. No. 729,534, Oct. 4, 1976, abandoned.

[51] Int. Cl.[2] .................. G03B 27/32; G03G 15/00

[52] U.S. Cl. .................. 355/26; 355/77; 355/14 C

[58] Field of Search .................. 355/14, 23, 24, 26, 355/77, 14 R, 14 C; 364/200 MS File, 900 MS File

[56] References Cited

U.S. PATENT DOCUMENTS

| | | | |
|---|---|---|---|
| 3,904,816 | 9/1975 | Taud et al. | 358/80 X |
| 4,007,362 | 2/1977 | Sinderman | 235/151 |
| 4,034,400 | 7/1977 | Owen et al. | 358/75 |
| 4,076,408 | 2/1978 | Reid et al. | 355/14 |

*Primary Examiner*—John Gonzales
*Assistant Examiner*—W. J. Brady
*Attorney, Agent, or Firm*—Carl M. Wright; Herbert F. Somermeyer

[57] ABSTRACT

Copy production machine having a print mode for making copies under automatic control interruptible by a copy mode, of making copies. In the print mode images to be copied are automatically supplied to a copy production portion. In the print mode, images are preferably precollated, whereas in the copy mode, produced copies are collated from plural image sources. The first set of each print job is printed one sheet at a time ad seriatum; in subsequent sets all first sides are printed, then all second sides. The first set printing is interleaved with image signal reception and in all subsequent sets, all image signals for the sets or production portion of a set have been received.

21 Claims, 11 Drawing Figures

| INSTR | SEQ 1 CL | SEQ 1 ALU | SEQ 2 CL | SEQ 2 ALU | SEQ 3 CL | SEQ 3 ALU | SEQ 4 CL | SEQ 4 ALU | SEQ 5 CL | SEQ 5 ALU | SEQ 6 CL | SEQ 6 ALU |
|---|---|---|---|---|---|---|---|---|---|---|---|---|
| AR SR LR | IBL | M ↑ | (TB⇒IB) IRH | M X | PCI | M NOTE 4 | (TERM) | NOTE 4 | | | | |
| LRE LRD | IBL | M | (TB⇒IB) IRH | M X | PCI | M NOTE 5 | WRT IRL | NOTE 5 | WRT IRH | TBNS (XX→DB) ACH + DO | (TERM) | TBNS |
| STR | PCI | M | (TB⇒IB) WRT IRH | X (X→DB) ACH→DO | WRT IRL | ACL→DO | (TERM) | TBNS | | | | |
| AI SI | PCI | M INSTRUCTION | PCI | M NOTE 1 | (TERM) | NOTE 5 | | | | | | |
| CI GPI [LI XI OI NI] | PCI | M | PCI | M ACL x TB → DO → [ACL] | (TERM) | X | | | | | | |
| CB [AB SB LB XB OB NB] | PCI | M PREVIOUS | TB | M (ACL→DO) | (TB⇒IB) PCI | X | (TERM) | ACL ± TB → DO → [ACL] | | | | |
| STB | PCI | M | WRT TB | ACL→DO | (TB⇒IB) PCI | X | (TERM) | X | | | | |
| AI SI SHL SHR | PCNI | M | (TB⇒IB) PCI | M NOTE 2 | (TERM) | NOTE 2 | | | | | | |
| TRA | PCI | M | (TERM) | NOTE 3 | | | | | | | | |
| CLA / [IC] | PCI | M CL AC / SET IC | (TERM) | X / COT*→EQ | | | | | | | | |
| TBP [TBR] | PCI | M ↓ | (TERM) | ACL M → DO → [ALL] | | | | | | | | |
| POR (IJD) | | | | | | | IB→"CLA" POR CODE | X RST LOGIC 32→DO | | | | |

TIME Ø2 220 Ø1 Ø2 Ø1 Ø2 Ø1 Ø2 Ø1 Ø2 Ø1 Ø2 Ø1 Ø2

NOTE 1: ACL±TB; +DB→ACH; ACH→DO→ACL
NOTE 2: ACL MODIF→DB→ACH; ACH→DO→ACL
NOTE 3: ACL→DB→ACH; ACH→DO→ACL
NOTE 4: ACL ± TB→DB→ACH; ACH→DO→ACL
NOTE 5: ACL +Δ→BB→ACH; ACH→DO→ACL

FIG. 5

| INSTR | SEQ 1 | | SEQ 2 | | SEQ 3 | | SEQ 4 | | SEQ 5 | | SEQ 6 | |
|---|---|---|---|---|---|---|---|---|---|---|---|---|
| | CL | ALU | CL | ALU | CL | ALU | CL | ALU | CL | ALU | CL | ALU |
| BAL | PCI | ← PREVIOUS INSTRUCTION → | IB SET PCI | (ACH → DO) ACL → DB | NOTE 7 | PCL → DO | WRT IRH | PCH − 1 + CR → DO | NOTE 9 | NOTE 10 | (TERM) | SET TRA |
| RTN | IBL | | IRH | NOTE 5 | IRL + 8 | (ACH → DO) ACL → DB | NOTE 8 | NOTE 10 | PCI | NOTE 11 | (TERM) | (ACL → DO) |
| BØØ | PCNI | | NOTE 3 | PCH − 1 → [AOH] | PCI | X | (TERM) | X | | | | |
| $\overline{\text{BØØ}}$ | PCI | | PCI | X | (TERM) | X | | | | | | |
| IJO | PCNI | | NOTE 4 | PCH − 1 → [ACH] | PCI | X | (TERM) | X | | | | |
| $\overline{\text{IJO}}$ | PCI | | (TERM) | X | | | | | | | | |
| BLI | IBL | | (TB ⇒ IB) IRH | NOTE 5 | PCI | (ACH → DO) ACL → DB | ACL → AOH TB → AOL | NOTE 10 | (TERM) | ITAL | | |
| BSI | IBL | | (TB → IB) IRH | NOTE 5 | PCI | (ACH → DO) ACL → DB | WRT ACL → AOH TB → AOL | NOTE 10 | (TERM) | TBNS | | |
| IN | PCI | | OUT 1st IO WRT TB | NOTE 6 | OUT 2nd IO WRT TB | ACL → DO | (TB → IB) PCI | X | (TERM) | IOD AC7* → EQ | | |
| OUT | PCI | | OUT 1st IO WRT TB | NOTE 6 | OUT 2nd IO WRT TB | ACL → DO | (TB → IB) PCI | X | (TERM) | IOD AC7* → EQ | | |
| INTERUPT 1-5 | NOTE 1 | | STR ACH WRT 4H | NOTE 5 | STR LOW AC WRT 4L | ACL → DB ACH → DO | STR OLD STAT WRT 8L | TBNS STAT → DO → ACL | HI ADD READ 12 H | TBNS PCL → DO → ACL | (TERM) | |
| INTERUPT 6-10 | NOTE 2 | ACL − 1 → DO | STR PCH WRT OH | PCH − 1 + CR → DO | NEW STAT 8H | X | NOTE 9 | NOTE 10 | PCI | UPDATE STAT | (TERM) | |

220 Ø1 Ø2 Ø1 Ø2 Ø1 Ø2 Ø1 Ø2 Ø1 Ø2 Ø1 Ø2

NOTE 1: LOW ADDRESS READ 12L
NOTE 2: STR PCL WRT OL
NOTE 3: CAL HIGH BITS; TB → AOL
NOTE 4: CAL HIGH BITS; IB → AOL
NOTE 5: ACL → DB → ACH; ACH → DO → ACL
NOTE 6: TB (MODIFIED) → DO
NOTE 7: SET IB TO "TRAP"; WRITE IRL
NOTE 8: UPDATE PC; ACL → ACH; TB → ACL
NOTE 9: UPDATE PC; ACL → AOH; TB → AOL
NOTE 10: ACL → AOH; DB → ACH; ACH → DO → ACL
NOTE 11: (ACL → DO) STAT
UPDATE IF REGO GRPO

FIG. 6

COPY PRODUCTION MACHINES

DOCUMENTS INCORPORATED BY REFERENCE

This application is a division of application Ser. No. 768,651, filed Feb. 14, 1977, which is a continuation-in-part of application Ser. No. 729,534, filed Oct. 4, 1976, now abandoned.

U.S. Pat. No. 3,898,627 shows a laser type image generator usable with the present application in the laser input (LI) portion 12B of original input optics 12.

Nonvolatile store NVS 19 (FIG. 1A) is preferably a magnetic disk digital data signal recorder. U.S. Pat. Nos. 3,668,658 and 3,879,757 show disk media and apparatus suitable for NVS 19. U.S. Pat. No. 3,503,060 shows recording and head control for a disk apparatus, the teachings of which may be applied to NVS 19.

U.S. Pat. No. 3,588,242 shows a convenience plain paper copier having a programmable relay controller usable in the copy production portion CPP 13 (FIG. 1B) with the understanding that the illustrated computer machine control circuits replace the programmable relay controller disclosed in the U.S. Pat. No. 3,588,242.

BACKGROUND OF THE INVENTION

The present invention relates to copy production machines, and more particularly to copy production machines capable of electronically collating images prior to printing copies.

Ever since Gutenberg's invention of the printing press, man has continually improved and modified the processes and machines for producing image bearing copies. Today, a wide variety of copy production machines exists for producing copies under varying conditions and at various speeds. Many of the copy production machines are of the so-called convenience copier class, wherein a relatively small number of copies are made from a given original. Other copy production machines produce a greater number of copies per original image through varying copy production processes, such as offset printing, transfer electrographic techniques, thermal techniques, noncontact printing, such as by ink jets, and impact printing.

Since the advent of power typing and utilization of magnetic memory tapes and cards, as well as optical systems, a set of diverse techniques for word processing has evolved. A main thrust in word processing development has been toward relieving the typist from repetitive typing in the same manner that copy production machines have relieved man from manual copy production. Both systems are commonly used independently in business and offices. The functions have been treated as independent office functions. It seems that such independent usage may not use the optimum capabilities of both apparatus.

These devices are often connected to low or medium speed communications links. It is desirable to use efficiently such devices by minimizing idle time in communications situations.

SUMMARY OF THE INVENTION

It is an object of the present invention to combine word processing and copy production in a new and efficient manner for office systems.

A copy production machine using the present invention is capable of serially receiving images to be printed. Examples of image sources are magnetic recorder and data communication systems. The original images are automatically electronically manipulated (precollated) for producing a set of image bearing copies in accordance with such original image manipulations. The received images include instructions for printing termed "operator control language". When such operator control language or other machine instruction indicates duplex copies are to be printed, a first collated set of copies is printed serially, sheet by sheet. That is, each sheet has both sides printed or imaged before another sheet is printed. Any text processing for each sheet appears to be achieved simultaneously with receipt of image signals for the print job. At the end of printing the first collated set, all the received image-indicating signals have been text processed and appropriately stored in a memory for rapid retrieval. All subsequent collated sets are printed first on one side of all sheets of the set, and then all the sheets are printed on a second side.

The foregoing and other objects, features, and advantages of the invention will be apparent from the following more particular description of preferred embodiments of the invention as illustrated in the accompanying drawings.

THE DRAWINGS

FIGS. 2A and 3B are schematic block diagrams of interconnections between a controlling digital computer and a controlled unit as connected for use in the controller illustrated in FIG. 2 for SCP 60 and CMC 61 respectively.

FIGS. 5 and 6 are charts showing the instruction execution of the pipelined processors.

DETAILED DESCRIPTION

Figure 1:
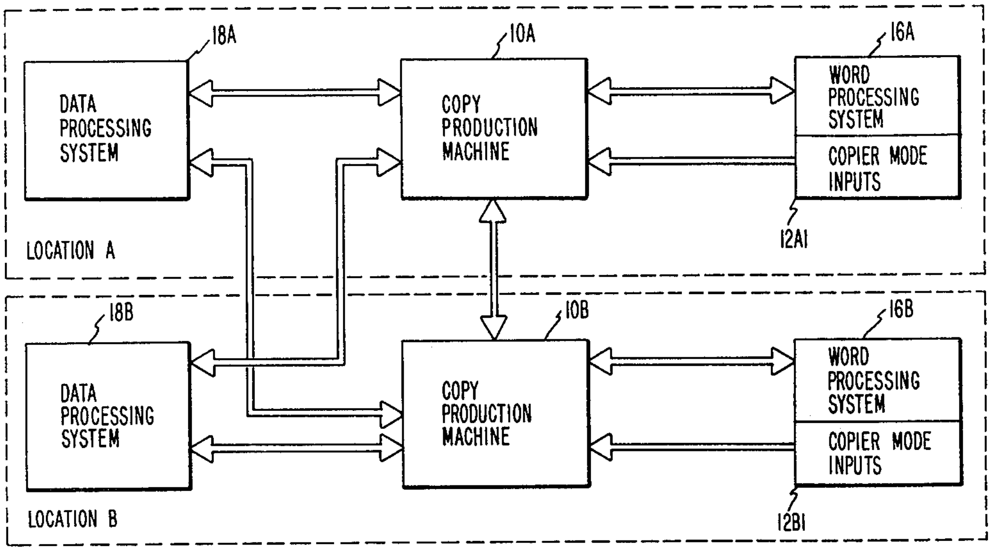
FIG. 1 is a block diagram of a system in which the present invention may be advantageously employed.

In the drawings, like numerals indicate like parts and features in the various diagrams. FIG. 1 shows communication and copy production network employing machines constructed using the present invention. Location A is physically remote from location B. Each location, A and B, has a copy production machine 10A and 10B, respectively, constructed in accordance with the present invention. Furthermore, each location A and B includes a word processing system 16A and 16B, respectively, copier mode input 12A1 and 12B1, respectively, and data processing systems 18A and 18B, respectively. The various illustrated units are connected by the copy production machine which includes word processing capabilities, data processing capabilities, and copy production capabilities. The machines 10A and 10B can intercommunicate for transferring image indicating signals such that signals originating in machine 10A can result in copies produced in machine 10B. Similarly, copy production machines 10A and 10B also provide computer output from either of the illustrated data processing systems 18A and 18B. The machines also can receive word processing indicating signals from systems 16A and 16B as well as supplying word processing indicating signals to such systems. The copier mode inputs 12A and 12B create images from original documents for the production of copies by the machines 10A and 10B, respectively. Scanners may be employed to transmit original documents using either digital or slow-scan video (analog) techniques. Accordingly, in practicing the present invention in the manufacture of copy production machines, such machines can be advantageously employed in complex image transferring communication networks as will become more readily apparent.

Figure 1A:
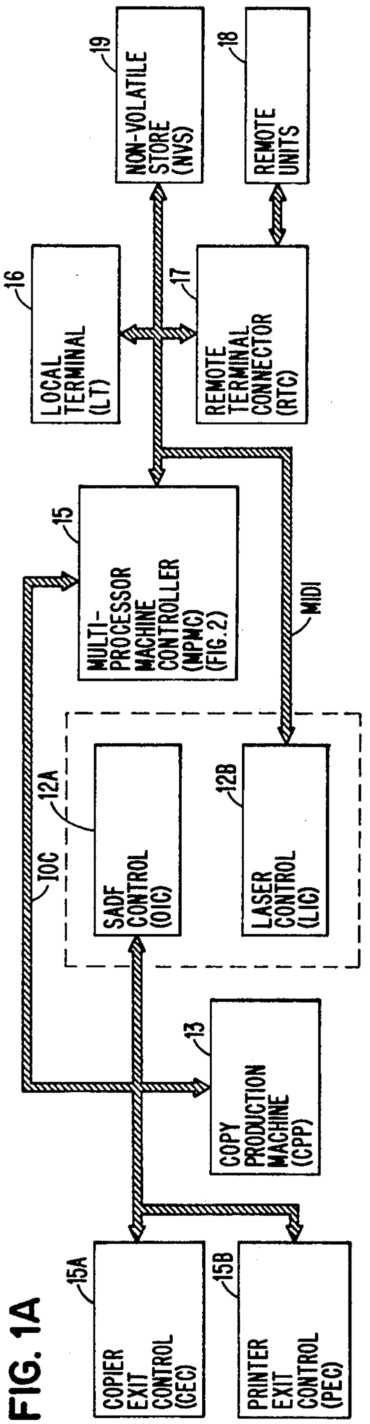
FIG. 1A is a block diagram of control circuits interpreting the present invention.
Figure 1B:
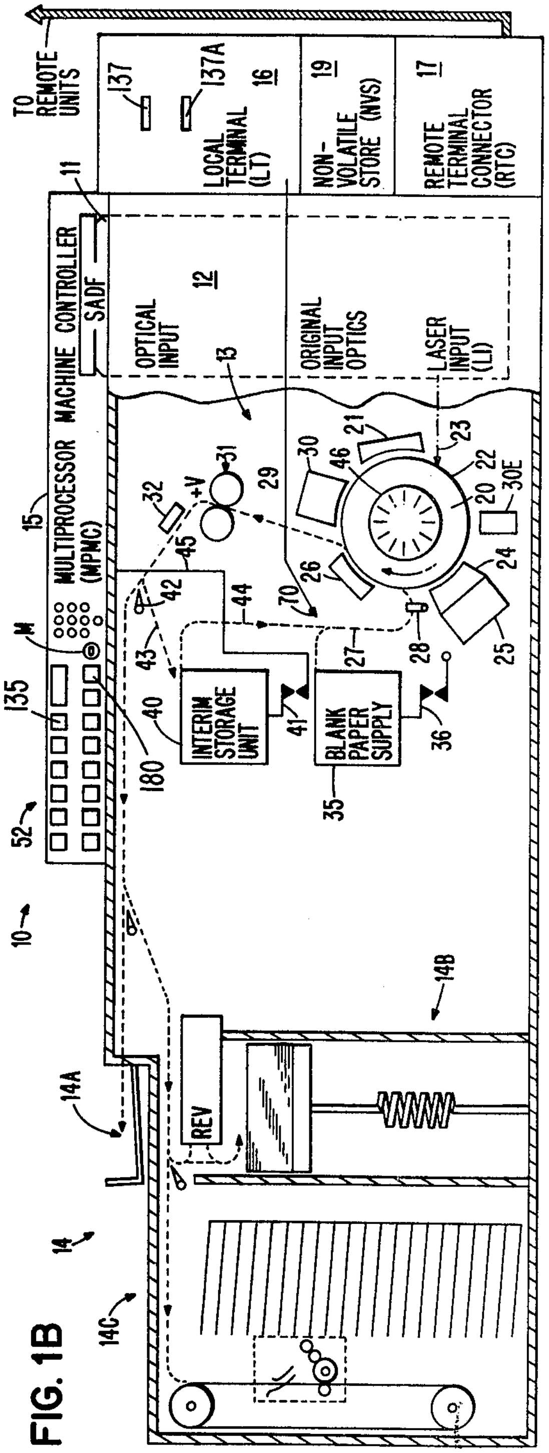
FIG. 1B is a diagrammatic showing of a machine incorporating the present invention and controlled by the FIG. 1A illustrated control circuits.

FIGS. 1A and 1B show a copy production machine 10 constructed using the principles of the present invention and which may be advantageously employed in the FIG. 1 illustrated image communication network. The copy production machine centers around a copy production portion CPP 13. CPP 13 is illustrated as a transfer electrographic copy production portion, no limitation thereto being intended. A plurality of image inputs are provided to CPP 13. Such inputs, designated by numeral 12, include a document scanning optical input in optical communication with a semiautomatic document feed SADF 11. SADF 11 includes a document glass on which an original document may be placed either manually by lifting a SADF lid (not shown) or via semiautomatic document feed from an input tray (not shown). The optical image from SADF 11 is transmitted to CPP 13 using known optical techniques commonly found in convenience copiers of several types. Additionally, original input optics 12 includes a laser input LI which receives word processing indicating signals for creating an optical image as an image input to CPP 13 via common input 23. The original input optics 12 includes a SADF control OIC 12A as well as a laser input control 12B.

Figure 2:
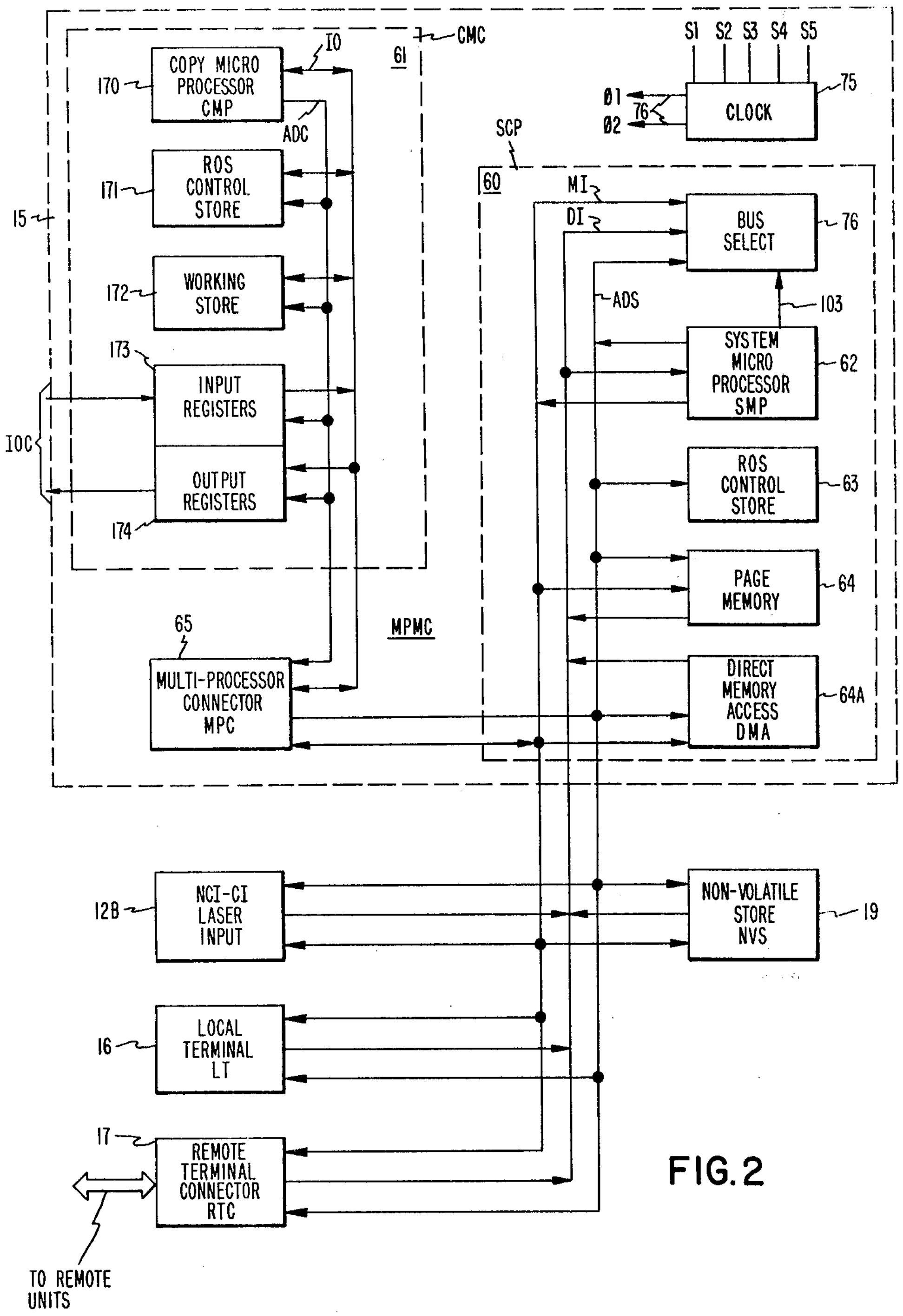
FIG. 2 is a block diagram of a multiprocessor machine controller used in the FIG. 1A control circuits.

The laser input can receive signals from a local terminal LT 16 which is a word processing terminal for receiving word processing signal-bearing magnetic cards at input slot 137 and for ejecting such cards at output slot 137A. Signals from LT 16 are temporarily stored in nonvolatile store NVS 19. Additionally, for communication in an image communication network as shown in FIG. 1, a remote terminal connector RTC 17 provides signal communication to various remote units, collectively designated by numeral 18. In FIGS. 1A and 1B, numeral 18 indicates the remainder of the network as shown in FIG. 1. The word processing signals from LT 16 or RTC 17 are initially stored in memory 64 (FIG. 2). From memory 64 multiprocessor machine controller MPMC 15 effects transfer of the signals to LIC 12B for generating an image to be transferred to CPP 13, as will become more radily apparent as well as to NVS 19. In producing a first set of copies, signals from memory 64 actuate LIC 12B. In second and higher numbered sets, signals stored in NVS 19 go to memory 64 to be supplied to LIC 12B for image generation. In one embodiment, print jobs received by RTC 17 and LT 16 are alternated. A priority scheme could be employed if desired.

Copy production machine 10 also includes a copy output portion 14 having a plurality of copy receiving units. When laser input LI 12 supplies images to CPP 13, the copies produced are directed toward output portion 14B as will be later more fully described. When SADF 11 is used as an input to optics 12, the copy production machine 10 is in what is termed a copy mode wherein the copies produced by CPP 13 are directed either to copy exit tray 14A or to copy collator 14C. The output unit 14B in a constructed embodiment was reserved for copies produced in the print mode.

MPMC 15 controls all units in copy production machine 10. The various closely controlled units such as LIC 12B, NVS 19, RTC 17 and LT 16, are controlled by a pair of later described unidirectional busses collectively designated by MIDI in FIG. 1A. The other units are those related to copy production and which are controlled by MPMC. Communication is by way of a bidirectional data bus IOC shown connected to the copier exit control CEC 15A, printer exit control PEC 15B, CPP 13, and SADF control 12A. The interactions of the various units of copy production machine 10 will become apparent from a continued reading.

CPP 13

Before proceeding further with the description of the invention, the operation of CPP 13 is described as a preferred constructed embodiment employing xerographic transfer electrographic techniques. Photoconductor drum member 20 rotates in the direction of the arrow past a plurality of xerographic processing stations, the first station 21 which imposes either a positive or negative electrostatic charge on the surface of photoconductor member 20. It is preferred that this charge be a uniform electrostatic charge over a uniform photoconductor surface. Such charging is done in the absence of light such that projected optical images, indicated by dash line arrow 23, alter the electrostatic charge on the photoconductor member in preparation for image developing and transferring. The projected optical image from original input optics 12 exposes the photoconductor surface in area 22. Light in the projected image electrically discharges the surface areas of photoconductor member 20 in proportion to light intensity. With minimal light reflected from the dark or printed areas of an original document, for example, there is no corresponding electrical discharge. As a result, an electrostatic charge remains in those areas of the photoconductive surface of member 20 corresponding to the dark or printed areas of an original document in SADF 11 (semiautomatic document feed) of the image created. This charge pattern is termed a "latent" image on the photoconductive surface. Interimage erase lamp 30E discharges photoconductor member 20 outside defined image areas.

The next xerographic station is developer 24 which receives toner (ink) from toner supply 25 to be deposited and retained on the photoconductive surface still having an electrical charge. The developer station receives the toner with an electrostatic charge of a polarity opposite to that of the charged areas of the photoconductive surface. Accordingly, the toner particles adhere electrostatically to the charged areas, but do not adhere to the discharged areas. Hence, the photoconductive surface, after leaving station 24, has a toned image corresponding to the dark and light areas of an original document in SADF 11 or of the image supplied by LI laser input.

Next, the latent image is transferred to copy paper in transfer station 26. The paper is brought to the station 26 from an input paper path portion 27 via synchronizing input gate 28. In station 26, the copy paper is charged and brought into contact with the toned image on the photoconductive surface which results in a transfer of the toner to the copy paper. After such transfer, the sheet of image bearing copy paper is stripped from the photoconductive surface for transport along path 29. Next, the paper has the electrostatically carried image fused thereon in fusing station 31 for creating a permanent image on the copy paper. The copy paper receives electrostatic charges in station 26 which can have an adverse effect on copy handling. Accordingly, the copy paper is electrically discharged at station 32 before transfer to output portion 14.

After the image area on member 20 leaves transfer station 26, there is a certain amount of residual toner on the photoconductive surface. Cleaner station 30 has a rotating cleaning brush (not shown) to remove the residual toner for cleaning the image area in preparation for receiving the next image projected by original input optics 12. The cycle then repeats by charging the just-cleaned image area at charging station 21.

The production of simplex copies or the first side of duplexing copies by portion 13 includes transferring a blank sheet of paper from blank paper supply 35, to transfer station 26, fuser 31, and, when in the simplex mode, directly to the output copy portion 14. Blank paper supply 35 has an empty sensing switch 36 which inhibits operation of portion 13 in a known manner whenever supply 35 is out of paper.

When in the duplex mode, duplex diversion gate 42 is actuated by the duplex controlling circuits (not shown) to the upward position for deflecting single-image copies to travel over path 43 to the interim storage unit 40. These duplex controlling circuits (not shown) are actuated by MPMC 15. Here, the partially produced duplex copies (image on one side only) for the next subsequent single-image run in which the copies receive the second image. Copies stored in interim storage unit 40 are in an intermediate copy production state.

In the next single-image run, initiated by inserting a document into SADF 11 or via MPMC 15, the copies are removed one at a time from the interim storage unit 40, transported over path 44, to path 27 for receiving a second image, in a manner previously described for the first side. The two-image duplex copies are then transferred into output copy portion 14. Switch 41 of interim storage unit 40 detects whether or not there are any copies or paper in interim storage unit 40. If so, an intermediate copy production state signal is supplied over line 45 to later described control circuits.

The copy production machine has a control panel 52 having a plurality of lights and switches (most not shown) and connected to MPMC 15 for operating the entire machine 10 synchronously with respect to the movement of the image areas of photoconductor member 20. Billing meter M counts processed images for billing purposes. For example, paper release gate 28 is actuated synchronously with the image areas moving past developer station 24. Such controls are well known in the art and are not described here for purposes of brevity.

MPMC 15

The multiprocessor machine controller MPMC 15 is shown in block diagram form in FIG. 2. MPMC 15 includes a production machine controlling subsystem SCP 60 and a copy production machine controlling subsystem CMC 61. SCP 60 includes a system microprocessor SMP 62 which executes a set of control programs contained in control store 63 (either ROS or RAM or a combination of both) and uses page memory 64 as a main or working store. SMP 62 communicates with the other units in SCP 60, as well as peripheral units as with later discussed, via a set of three unidirectional data transfer busses. The bus DI transfers data signals from the other units to SMP 62. In a preferred constructed embodiment, DI is eight bits (one character) plus parity, and signals emanating from SMP 62 were carried over bus MI to all of the other units. Address signals, selecting which units are to send or receive signals with respect to SMP 62 as well as the other units, are provided by SMP 62 over sixteen bit wide address bus ADS. The above-described bus interconnections also provide signal communication between SCP 60 and the nonvolatile store 19, laser input 12B, local terminal LT 16, remote terminal connector RTC 17, and CMC 61 via multiprocessor connector MPC 65.

CMC 61 is constructed similarly to SCP 60. It includes a copy microprocessor CMP 170 plus a control store 171 containing programs for operating CPP 13, a working store 172 for use as a main memory, and input/output registers 173 and 174. Signal communication between these units is via a bidirectional eight bit data bus I/O under addressing control from CMP 70 via sixteen bit address bus ADC. CMP 170 supplies address signals over bus ADC for selecting the source and destination of signals with respect to CMP 170. Such selection includes an address to multiprocessor connector MPC 65. I/O bus is preferably a character wide (eight bits) while ADC is preferably two characters, i.e., sixteen bits. CMC 61 via MPC 65 appears as an I/O device to the SCP 60 in the same manner as units 19, 12B, 16, and 17 appear as I/O device. Processor intercommunication via MPC 65 requires a plurality of memory cycles in both SCP 60 and CMC 61. A clock 75 times SCP 60 and CMC 61 on a memory cycle synchronized basis. That is, page memory 64 and working store 172 have identical length memory cycles. The operation of the memories is synchronized under control of a two-phase clock, 0 1, and 0 2, supplied over lines 76 to all units within MPMC 15. Timing connections are not shown for purposes of brevity. Additionally, clock 75 issues a series of S pulses, S1 through S5, for timing instruction execution within CMP 170 and SMP 62.

Additionally, it may be desired under program control to interconnect logically the busses MI, DI and ADS to enable the signal transfers in later described desired paths. To achieve this result, bus select circuit 76, under SMP 62 control, provides communication between the various busses. For example, signals received from MPC 65 on bus MI can be transferred through bus select circuit 76 to bus DI for receipt of SMP 62. Other permutations on signal transfers via the busses can be easily envisioned.

Figure 3A:
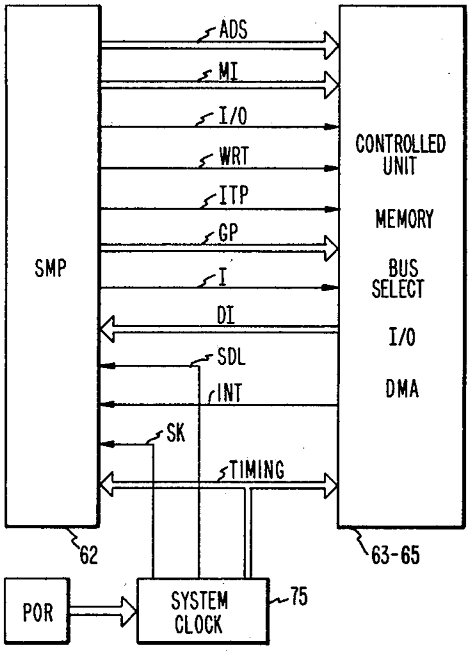

In FIG. 3A, the logical interconnections between SMP 62 and controlled units 63-65 and so forth is shown. All of the signals on the busses and individual control lines go to all units with the ADS and GP signals selecting which controlled unit is to respond for either receiving data signals or supplying data signals, respectively. SMP 62 supplies addressing signals over bus ADS to all units. If the instruction supplied over bus GP indicates data is to be transferred from SMP 62 to a controlled unit, the I/O line carries a binary one to indicate signals are to be transferred from the microprocessor over DI and a binary zero to indicate microprocessor SMP 62 supplies signals over MI. Write line WRT indicates to the page memory that signals are to be recorded in the memory. The ITP signal indicates an interrupt in process, i.e., the microprocessor 62 program has been interrupted and is handling that interrupt. I is the interrupt request signal SDL is received from system clock 75, and latches data, as will be later explained with respect to FIG. 4. The line SK (sliver-killer) is a control signal for eliminating extraneous signals commonly referred to as slivers. The so-called sliver signals result from interaction between successively actuated bistable circuits termed latches. Other timing signals for coordinating operation of all of the units in the MPMC 15 are received from system clock 75. Additionally, power on reset circuit (POR) activates system clock 75 to send out timing signals and control signals for resetting all of the units to a reference state as is well known in the computer arts.

In the CMC 61, the decoding circuits and logic circuits which respond to the above-described signals are those normally used in conjunction with interconnecting controlling and controlled units. Since such circuits and design principles are well known, further description of these details are dispensed with.

Figure 3B:
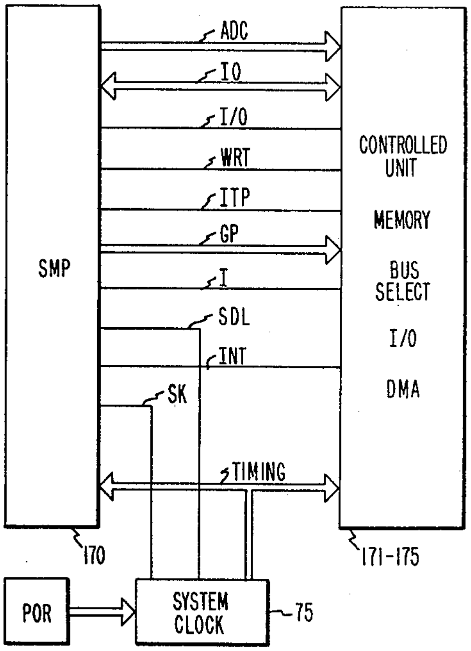

In FIG. 3B, the logical interconnections between microprocessor 170 and controlled units 171-175 are shown. The signals on the busses and individual control lines having the same function as similarly labelled signals in FIG. 3A.

The Microprocessors 62 and 170

Figure 4:
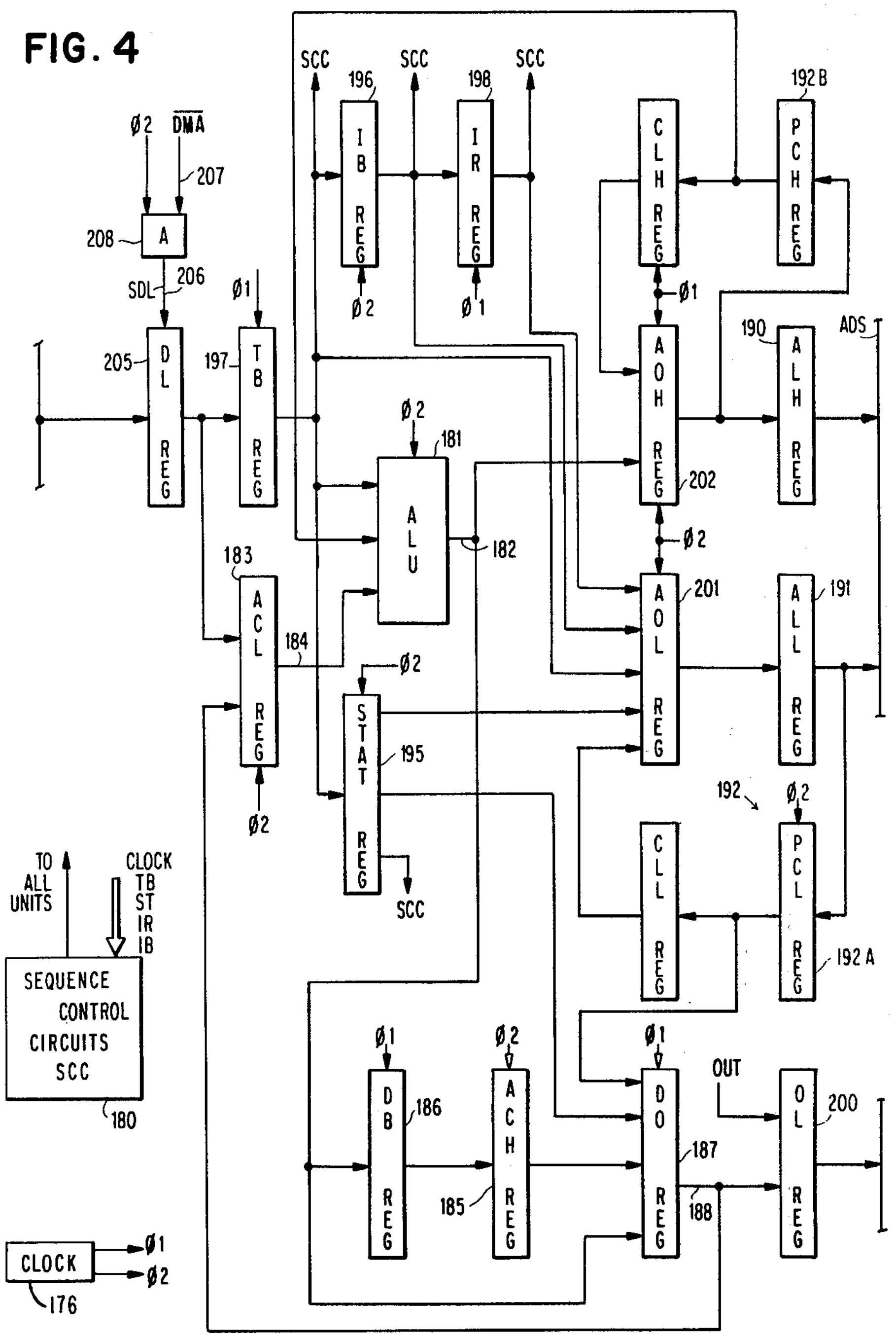
FIG. 4 is a block diagram showing a digital computer used in the controller illustrated in FIG. 2.

In FIG. 4, the data flow of the microprocessor 170 is detailed. The data flow and operation of SMP 62 are identical. The sequence control circuits 180 are those logic circuits designed to implement the now to be described functions performable in the timing context of the following description. Such sequence control circuits SCC 180 include instruction decoders, memory latches, and the like, for sequencing the data-flow circuits operation of the illustrated in FIG. 6, using a two-phase clock, 01 and 02 from clock 176. The processor contains an eight-bit (one character) arithmetic and logic unit ALU 181. ALU 181 receives signals to be combined during 02 and supplies static output signals over ALU output bus 182 during each 01. Operatively associated with ALU 181 is a sixteen bit accumulator consisting of two registers, a low register ACL 183 which has its output connections over eight-bit bus 184 as one input to ALU 181. The second register of the accumulator is ACH register 185. When the microprocessor 170 operates with a two-character or two-byte word, the functions of ACL 183 and ACH 185 alternate. That is, in a first portion of the operation, which requires two complete microprocessor 170 cycles as later described, ACL 183 contains the lower order eight bits of a 16 bit word, and ACH 185 contains the upper order eight bits of the sixteen-bit word. ALU 181 first operates on the lower eight bits received over ACL bus 184 and supplies the result signals over ALU output bus 182 to DB register 186. During this same transferring action, ACH 185 is supplying the upper eight bits through DO register 187, thence over DO bus 188 to ACL 183. During the next ALU cycle, the upper eight bits are operated on. In the preferred and constructed embodiment, ALU 181 operates with two's complement notation and can perform either eight-bit or sixteen bit arithmetic as above described. Eight-bit logical operations are also performed.

ALU 181 contains three indicating latches (not shown) which memorize the results of arithmetic and logical operations for use in later processor cycles such as conditional jumps or branches and so-called input carry instructions. These three indicators are low, equal (EQ), and carry. Utilization of these indicators will be better understood by continued reading of the specification. Processor sequence control circuits 180 can control a single level of interrupt and include an internal interrupt mask register (not shown) for disabling interrupts as is well known in the computer arts. The low order bits of the address signals supplied to bus ADS by the ALH register 190 (high order bits of the address) and ALL register 191 (the low order eight bits of the address) are designated as work registers. These registers are divided into 32 groups of 16 2-byte logical registers. A portion of ALL register 191 supplies GP signals for selecting which groups of registers are accessible by microprocessor 170.

As will be later detailed, microprocessor 170 requires two processor cycles for processing an I/O instruction. The first cycle is a set-up cycle and the second cycle is a data transfer cycle. When an I/O operation requires a transfer of a succession of bytes, then the first cycle sets up a unit 171-175 for transferring a plurality of bytes such that the I/O operation appears as a set-up cycle followed by a plurality of data transfer cycles. The microprocessor 170 is designed to operate with a plurality of relatively slow acting devices, i.e., copy production machine 10. The time required for the microprocessor 170 to perform its functions is relatively short compared with the time required by the controlled devices. Accordingly, under clock 176 control, the microprocessor 170 can be effectively turned off to allow a controlled device to have exclusive use of the IO bus.

From examination of FIG. 6, it can be seen that all of the registers, being latches, will maintain their respective signal states whenever the clock phases, 01 and 02, are not supplied. Therefore, upon an interruption of the microprocessor 170 functioning by a controlled device 171-175, the signal state of the processor 170 enables it to begin operating again as if there had been no interruption.

The other registers in the microprocessor 170 are described with the instruction set for facilitating a better understanding of the interaction of these registers. The microprocessor employs instructions of variable length, 1, 2, or 3 bytes. The first byte of any instruction always includes the operation code and succeeding bytes, numbered 2 or 3, contain address data or immediate operand data.

The fastest instruction execution requires one microprocessor cycle and the longest instruction requires six processor cycles. An interrupt requires ten cycles to process. In all designations, bit 0 is the least significant bit.

Instruction Repertoire

The instruction repertoire is described in groups of instructions, all of which have defined instruction word formats. The instructions are defined by the title, mnemonic, number of cycles required by the microprocessor to execute the instruction, number of operands (OP), and the number of bytes in the instruction word. Additionally, breakdown of the command structure of the first byte is given.

REGISTER ARITHMETIC

| Instruction | Mnemonic | Cycles | OP | Bytes |
|---|---|---|---|---|
| Add | AR | 3 | 1 | 1 |
| Subtract | SR | 3 | 1 | 1 |
| Load | LR | 3 | 1 | 1 |
| Store | STR | 3 | 1 | 1 |
| Load/Decrement | LRD | 5 | 1 | 1 |
| Load/Bump | LRB | 5 | 1 | 1 |

The instruction byte is divided into two portions. The most significant four bits indicate the instruction code and the least significant four bits select a register within a group of sixteen registers as the operand source. All operations results are stored in the accumulator register. The Register Arithmetic is two-byte arithmetic.

BYTE ARITHMETIC

| Instruction | Mnemonic | Cycles | OP | Bytes |
|---|---|---|---|---|
| Add | AB | 3 | 1 | 2 |
| Subtract | SB | 3 | 1 | 2 |
| Load | LB | 3 | 1 | 2 |
| Store | STB | 3 | 1 | 2 |
| Compare | CB | 3 | 1 | 2 |
| And | NB | 3 | 1 | 2 |
| Or | OB | 3 | 1 | 2 |
| Xor | XB | 3 | 1 | 2 |

The most significant byte of the instruction indicates the instruction command. The second byte indicates one of 256 byte addresses in memory to be used in the arithmetic operations. The difference between register arithmetic and byte arithmetic is that byte arithmetic obtains the operand from memory.

IMMEDIATE ARITHMETIC

| Instruction | Mnemonic | Cycles | OP | Bytes |
|---|---|---|---|---|
| Add | AI | 2 | 1 | 2 |
| Subtract | SI | 2 | 1 | 2 |
| Load | LI | 2 | 1 | 2 |
| Compare | CI | 2 | 1 | 2 |
| AND | NI | 2 | 1 | 2 |
| Or | OI | 2 | 1 | 2 |
| Xor | XI | 2 | 1 | 2 |
| Group | GI | 2 | 3 | 2 |

The format is the same as for byte arithmetic with the second byte being the operand data. In the last instruction, Group, GI, the immediate data selects the registers in the register group as will become apparent.

ACCUMULATOR ARITHMETIC

| Instruction | Mnemonic | Cycles | OP | Bytes |
|---|---|---|---|---|
| Add 1 | A1 | 2 | 0 | 1 |
| Subtract 1 | S1 | 2 | 0 | 1 |
| Shift Left | SHL | 2 | 0 | 1 |
| Shift Right | SHR | 2 | 0 | 1 |
| Clear | CLA | 1 | 0 | 1 |
| Transpose | TRA | 1 | 0 | 1 |
| Input Carry | IC | 1 | 0 | 1 |

All 8 bits of byte 1 are used to denote the function to be performed. All operations are conducted within the accumulator. Transpose instruction, TRA, swaps the high and low order register contents of accumulator registers 183 and 185.

INDIRECTS

| Instruction | Mnemonic | Cycles | OP | Bytes |
|---|---|---|---|---|
| Store | STN | 4 | 1 | 1 |
| Load | LN | 4 | 1 | 1 |

This is an indirect addressing set of instructions wherein the most significant five bits indicate the function and the least significant three bits signify which of eight registers contain the address in memory to be accessed.

BIT CONTROL

| Instruction | Mnemonic | Cycles | OP | Bytes |
|---|---|---|---|---|
| Test/Preserve | TP | 1 | 1 | 1 |
| Test/Reset | TR | 1 | 1 | 1 |

The five most significant bits of the instruction byte indicate the function and the three least significant bits indicate which bit is to be tested in the accumulator register.

INPUT/OUTPUT

| Instruction | Mnemonic | Cycles | OP | Bytes |
|---|---|---|---|---|
| Input | IN | 4 | 1 | 2 |
| Output | OUT | 4 | 1 | 2 |

These two instructions use the first byte as a command and the second byte to address one of the 256 possible addresses on the busses, MI, DI, or IO.

BRANCHES

| Instruction | Mnemonic | Cycles | OP | Bytes |
|---|---|---|---|---|
| JUMP | J | 3 | 1 | 1 |
| JUMP NOT EQUAL | JNE | 3/1 | 1 | 1 |
| JUMP EQUAL | JE | 3/1 | 1 | |
| BRANCH | B | 3 | 1 | 2 |
| BRANCH NOT EQUAL | BNE | 3/2 | 1 | 2 |
| BRANCH NOT LOW | BNL | 3/2 | 1 | 2 |
| BRANCH EQUAL | BE | 3/2 | 1 | 2 |
| BRANCH HIGH | BH | 3/2 | 1 | 2 |
| BRANCH AND LINK | BAL | 6 | 2 | 3 |
| RETURN | RTN | 5 | 1 | 1 |
| INTERRUPT | — | 10 | | — |

The first three JUMP instructions are identified by the three most significant bits. A fourth bit indicate whether the four least significant bits, indicating the jump length, designate forward or backward jump.

In the branch instructions, except for the BRANCH AND LINK, the most significant four bits with the least significant two bits indicate the functions of the first byte. The other two bits indicate whether 256 is to be added or subtracted from the high address positions or not changed. The BRANCH AND LINK, a three-byte instruction, selects one of four registers with the least significant two bits of the first byte and uses the most significant six bits as a function indicator. The other two bytes are a fifteen bit address for designating the branch address, the second byte being the eight least significant bits and the third byte being the seven most signficant bits. The RETURN instruction is a one byte instruction having a similar format as the BRANCH AND LINK command byte. The interrupt is not an instruction, but a routine activated by a signal received over interrupt request line I.

ALU CONDITION CODES

The table below indicates the condition code in the ALU low, equal (EQ), or carry set as a result of the executed class of instructions as set forth in the table below.

| Instruction Class | Low | Equal (EQ) | Carry |
|---|---|---|---|
| Register Arithmetic | 16th bit = 1 | All bits (0-15) = 0 | Carry from 16th bit |
| Byte Arithmetic | 8th bit = 1 | All bits (0-7) = 0 | Carry from 8th bit |
| Bit Control | All bits exclusive of bit being tested = 0 | Tested bit = 0 | Unchanged |
| Shift Left | All bits = 0 | 0 was shifted out of the 16th bit | 1 was shifted out of the 16th bit |
| Shift Right | All bits = 0 | 0 was shifted out of the 1st bit | 1 was shifted out of the 1st bit |
| *Logical OR | Results of OR equals all ones | Bits set by OR were all 0's | Unchanged |
| **Logical AND | Preserved bits are all ones | Result of AND equals all 0's | Unchanged |
| Logical XOR | Results all ones | Results all zeroes | Unchanged |
| Input | All bits exclusive of bit 8 = 0 | 8th bit = 0 (Data Input and Output) | Unchanged |
| Input Carry | Always Reset | Carry = 0 | Unchanged |
| Compare | Number compared is greater than the byte of accumulator | Number compared equals the contents of the low byte of accumulator | Carry from 8th bit |

*Test the set of bits (set by "OR") to be all 0's, the result for all ones. Does TBS of individual bits. The set bits are indicated by ones in the mask (logical OR).
**Test the preserved bits to be all 0's, all ones, or mixed. The preserved bits are indicated by ones in the mask (logical AND).

most significant seven bits of the program counter is coded into the instruction byte to leave the high 8 bits the same, to add one to the most significant eight, or to subtract one from the most significant byte (plus 256 or minus 256).

Branch on Equal and Branch on Not Equal test only the condition of the ALU 181 EQ indicator. Branch on Not Low tests only the condition of the Low indicator. Branch on High requires that both the EQ and Low indicators be in the reset condition.

The BRANCH AND LINK instruction is an unconditional branch that specifies the fifteen bit absolute branch address of the program destination and a two bit number indicating a register to be used. The address of the next executable instruction (following the BAL) is stored in the register specified by the two bit number.

Interrupt is not a programmable instruction but is executed whenever the Interrupt Request line INT is activated by an external device and an Interrupt mask in STAT register 195 is equal to zero. Interrupt stops the execution of the program between instructions, reads A Jump instruction does not modify the accumulator 183, 185 or indicator bits whether taken or not. The program counter has had one added to it since it addressed the jump instruction. The program counter 192 includes PCL register 192A and PCH register 192B, hereinafter referred to as counter 192. If a jump is taken, the least significant four bits of the instruction replace the least significant four bits of the program counter 192 and the most significant eleven bits are modified if indicated. The range of the instruction address change is −15 to +17 bytes measured from the jump instruction address. If the destination is within this range, it is only necessary to specify the least significant four bits absolutely of the destination address and to use a bit to describe the direction (0 for +2 to +17 or 1 for −15 to +0, the +1 condition is not realizable). The +1 condition is not useful because the processor goes to +1 if the jump is not taken but, if it were valid, the processor would go to +1 if the jump was taken or not.

In a branch instruction, the program counter 192 has been incremented to point to the second byte of the branch instruction word. The least significant eight bits absolute of the destination program address are coded in the data byte (second byte). A code to modify the the new status (register group, interrupt mask, EQ, LOW, CARRY) from the high byte of REGISTER 8, stores the old status in the low byte of REGISTER 8, stores the address of the next instruction to be performed in REGISTER 0, stores the accumulator in REGISTER 4 (without altering the accumulator), and branches to the address specified by the contents of REGISTER 12. The processor always specifies REGISTER GROUP 0 for interrupt. Interrupt requires ten processor cycles to complete. Register groups will be later described.

Return is an unconditional branch to a variable address stored in a register specified by the instruction and can be used in conjunction with the BRANCH AND LINK to return to the main program after having been interrupted. Two bytes are read from the specified register to define the absolute branch address. A return using register $\phi$ of register group $\phi$ is defined as a return from interrupt. In this case, the new status (EQ, LOW, CARRY, interrupt mask and register group) is read from the low order byte of REGISTER 8.

Arithmetic Group instructions operate with the sixteen bit accumulator 183, 185 and eight bit arithmetic-logic unit ALU 181 that are capable of performing various arithmetic and logical operations. Three condition indicators (LOW, EQ, CARRY) are set according to the results of some operations. Two's-complement sixteen bit arithmetic is performed except for byte operations and some immediate operations which are two's-complement eight bit operations. The high order bit is the sign bit; negative numbers are indicated by a one in the sign bit position. Subtraction is accomplished by two's-complement addition. Any arithmetic operation that results in a CARRY will set the CARRY latch even though the accumulator may not be changed.

Double Byte Arithmetic is performed with registers 0-15 of the current group for the Add, Subtract, Load and Store instructions. Load Register and Bump (add +1) uses registers 4-7 and registers 12-15. Load Register and Decrement uses registers 0-3 and registers 8-11. In the add register and subtract register instructions, AR and SR, the sixteen bits of the addressed or specified register are added to or subtracted from the accumulator and the result is placed in the accumulator. EQ is set if the result is all zeroes. Low is set if the high order bit is a one.

Load Register instruction LR loads sixteen bit signal contents from the specified register into the accumulator 183, 185. The contents of the addressed register are unchanged. The ALU 181 indicators are not altered. The Store Register instruction, STR, stores the sixteen bit contents from the accumulator 183, 185 into the specified register. The contents of the accumulator 183, 185 and the ALU 181 indicators are not altered.

In the Load Register and Bump, LRB, and Load Register and Decrement, LRD instructions instruction, an absolute one is added to or subtracted from the contents of the specified register, respectively. The result is placed in the accumulator 183, 185 and the specified register. The indicators are updated as for an add or subtract, AR and SR.

For the Byte Arithmetic instructions, bytes 0-511 of memory 64 are addressable by the Byte Arithmetic instructions. The directly addressable memory 172 is divided into sections: bytes 0-255 which are addressable when register groups 0-7 are selected and bytes 256-511 which are addressable when register groups 8-15 are selected. Bytes 512-767 and 768-1023 are two additional groups. This sectioning yields 32 register groups in memory from which the processor operates.

In the instructions AB, SB, CB, LB and STB, the eight bit contents of the specified byte are added to, subtracted from, compared with, loaded into, or stored from the accumulator register ACL 183, respectively. The high order byte of the accumulator in ACH Register 185 is not disturbed. The ALU 181 condition indicators are set on the result of the single byte arithmetic; add, subtract, and compare. The results of all of the byte operations except compare CB and store STB are placed in the accumulator register 183. Store alters the specified byte in the active byte group. Compare is a subtract operation that does not alter the contents of the accumulator 183, 185. Byte arithmetic is eight bit signed arithmetic.

In the byte NB, OB and XB instructions, the specified byte is logically ANDed, ORed, or EXCLUSIVE-ORed with the accumulator register 183 contents, respectively. The result is kept in the accumulator register 183. The EQ ALU 81 indicator is set:

for the AND operation if the result of the AND equals all 0's;

for the OR operation if the bits set by the OR were all 0's; and for the EXCLUSIVE-OR operation if there is identity between the byte and accumulator (result=all 0's).

The LOW indicator is set:

for the AND operation if the preserved bits are all 1's; and for the EXCLUSIVE-OR operation if the byte and accumulator are bit for bit opposites (result=all 1's). The logical AND can test the selected mask to be all zeroes, all ones or mixed. The selected mask bits are indicated by ones in the corresponding positions of the byte used as the mask. The logical AND tests the bits that are preserved, and the logical OR tests the bits that are then set to one in the result. If only one bit is selected then the logical OR does a test bit and set.

The Immediate Arithmetic instructions AI, SI, CI, LI, NI, OI and XI are the same as the byte operations except that eight bits of immediate data are used instead of the contents of an addressed byte and the Add and Subtract Operations are sixteen bit signed arithmetic rather than 8 bit signed.

The Group Immediate instruction GI takes eight bits of immediate data to alter the contents of the status indicator register 195 to select register groups and to enable or to inhibit interrupt. LOW, EQ, and CARRY condition indicators in ALU 181 are not altered. The immediate data (byte two) is divided into five parts. BITS 0-3 are the new register group bits (new register group is coded in binary). BIT 5 is the command bit to put BITS 0-3 into the internal register group buffer if the command bit is a zero. BIT 7 is the new interrupt mask (a one masks out interrupts). BIT 6 is the command bit to put BIT 7 into the internal interrupt mask if the command bit is a zero.

The accumulator arithmetic instructions Al and Sl, respectively add or subtract an absolute one to or from the contents of the accumulator 183, 185, and the result is left in the accumulator 183, 185. This is sixteen bit signed arithmetic and the ALU 181 condition indicators are set depending on the result.

The accumulator instructions SHL and SHR shift the signal contents of the accumulator 183, 185 left or right one digit position or binary place, respectively. For shift left, the high order bit is shifted into the CARRY latch (not shown) in ALU 181 and a zero is shifted into the low order bit except when the previous instruction was an input CARRY. After an input CARRY, the CARRY latch condition before the shift is shifted into the low order bit. For shift right, the low order bit is shifted into the CARRY latch, and the state of the high order bit is maintained. When SHIFT RIGHT is preceded by input CARRY, the state of the CARRY latch before the shift is shifted into accumulator 183, 185 Bit 15. EQ condition indicator of ALU 181 is set if a 0 is shifted to the carry latch. LOW condition indicator of ALU 181 is set if the resulting contents of the accumulator 183, 185 is all 0's.

The accumulator instruction, CLA, clears the accumulator 183, 185 to all 0's. Transpose, TRA, exchanges the low order register 183 with the high order byte register 185 signal contents. The ALU 181 indicators are unchanged.

The accumulator instruction, IC, transfers the signal state of the CARRY latch to the low order bit of the arithmetic-logic unit 181 on the next following instruction if the next instruction is an add, subtract, bump, decrement, shift left, or compare operation. CARRY is set into BIT 15 by a shift right instruction. Interrupt is inhibited by this instruction until the next instruction is performed. The ALU 181 Low indicator is reset and the EQ indicator is set if the carry latch is a 0. If the input carry precedes any instruction other than the ones mentioned above, it will have no effect on instruction execution. If the instruction following the input carry changes the ALU 81 condition indicators, then the indicator information from the input carry is destroyed.

The two Indirect Data Transfer instructions STN and LN can access registers 8–15. Load Indirectly instruction accesses the specified register and uses its contents as an address to fetch a byte of data and load it into the low eight bits (register 183) of the accumulator without disturbing the high order eight bits (register 185). Store Indirectly accesses the specified register and uses its contents as an address to store the low order eight bits of the accumulator register 183 into the specified byte. The ALU 181 indicators are not altered.

The Bit Test or control instructions, TR and TP, test the specified bit of the low order byte of the accumulator register 183. The ALU 181 condition indicator EQ is set if the bit is a 0. Concurrently, the bit is either reset or preserved in the accumulator, respectively.

The Input/Output instructions, IN and OUT, respectively, transfer data to the accumulator register 183 from an I/O device (CPP 13, for example) and from the accumulator to an I/O device (CPP 13, for example). These instructions are two cycle operations. The first cycle puts the modified device code on the data out lines, and the second cycle is the actual data transfer cycle; the low order eight bits of the accumulator in register 183 are gated to data lines, and the device code is gated to the address lines ADC. An OUT instruction does not change the ALU 181 indicators. On an IN instruction, EQ is set if the high order bit of the data inputted is a $\phi$. LOW is always reset. The Input/Output instructions can specify one of 256 possible devices each for data transfer. Generally, an I/O device will require more than one device address to specify different types of operations such as READ and TEST STATUS, etc.

A Power On Reset POR initialization places the processor in the following state:

Accumulator = $\phi$
Register Group = $\phi$
Interrupt Mask = 1
LOW, EQ, CARRY = X (unknown)

The microprocessor 170 will begin operation by reading memory location 65,533.

MICROPROCESSOR INSTRUCTION EXECUTION

The processor 170 is pipelined to allow the memory 172 a full processor cycle for access time. To do this, the microprocessor 170 requests a read from memory several cycles ahead of when it needs a data byte. Several restrictions are maintained throughout the instruction set.

1. Each instruction must fetch the same number of bytes as it uses.

2. Each instruction must leave the microprocessor with the next instruction in the INSTRUCTION BUFFER, IB register 196.

3. At "Phase Two Time" at the beginning of Sequence Two, as later described, the TEMPORARY BUFFER (TB) 197 must contain the byte following the current instruction. (Note that this byte was fetched by the previous instruction.)

4. Each instruction decodes "TERM" (Terminate) as later described, which resets the instruction sequence counter (not shown) in clock 176 for CMP 176 and a separate sequence clock (not shown) for CMP 170 to Sequence one, allows the next fetch to be done from the IB 196 and loads the next instruction into IR 198.

5. At "Phase Two Time" at the beginning of instruction Sequence Two, the low accumulator register 183 and the high accumulator register 185 must contain the appropriate signals. (Note that the previous instruction may have had other data in these registers during its execution.)

Microprocessor 170 is built exclusively of latch logic. $\phi 2$ signals are the output of latches (or static decodes using the output of latches) that are strobed (sampled or transferred by a clock signal called a strobe) at $\phi 2$ time. $\phi 1$ signals are the outputs of latches (or static decodes using the outputs of latches) that are strobed at $\phi 1$ times. $\phi 1$ signals are used as the inputs to $\phi 2$ latches and $\phi 2$ signals are used as the inputs to $\phi 1$ latches.

Figure 7:
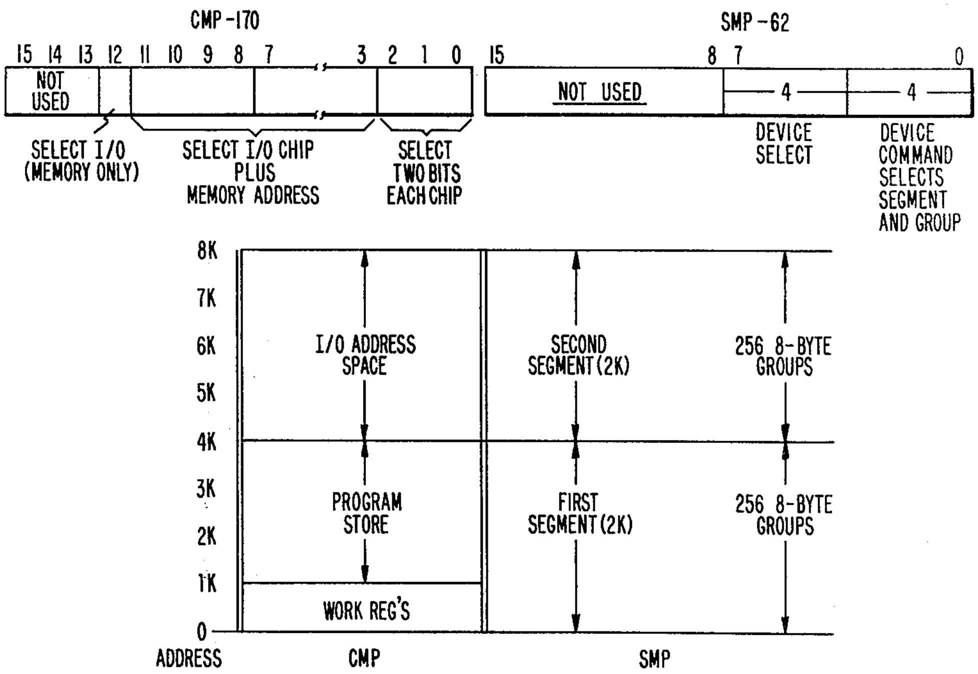
FIG. 7 is a diagram showing interprocess address space in the memory of CMC 61.
Figure 8:
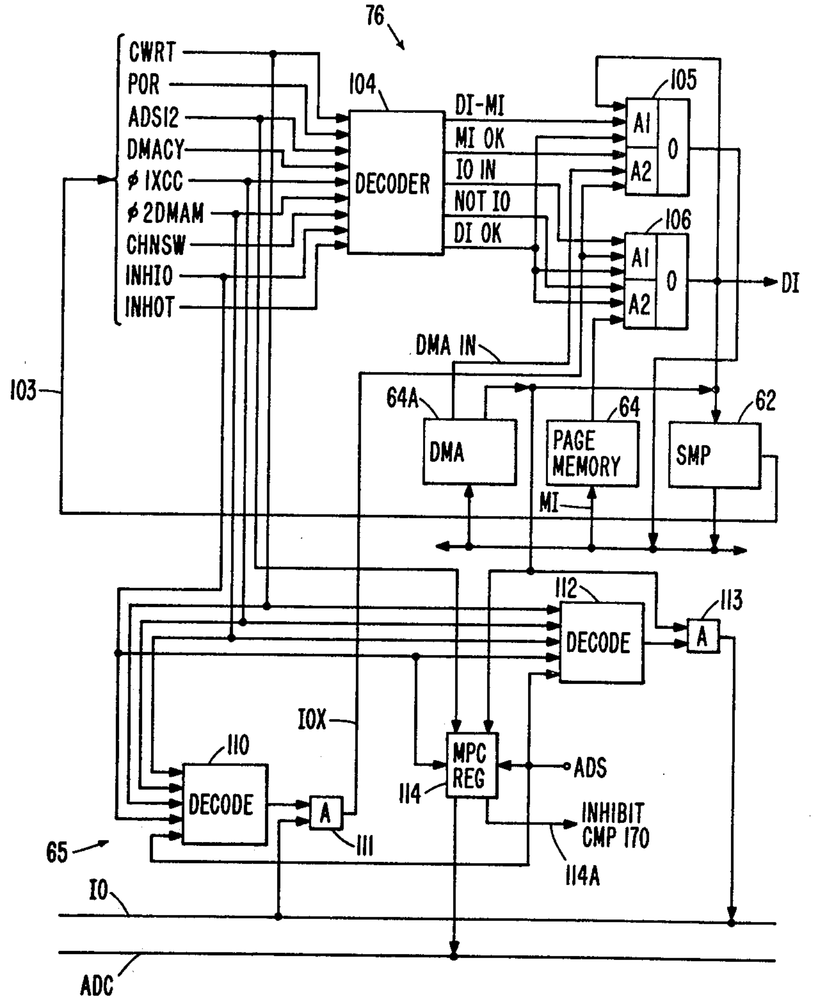
FIG. 8 is a simplified diagrammatic showing of MPC 65 and bus select circuit 76 bus connections and control.

The fetch decodes (memory references) are done from the IB register 196 at SEQUENCE 1 (SEQ 1) because the IR register 198 is loaded at $\phi 1$, SEQ 1 (FIGS. 7 & 8). At sequences other than SEQ 1, the fetch decode is done from IR register 198. The fetch decodes are $\phi 2$ signals and therefore are strobed at $\phi 1$. The output of the fetch decodes are strobed into registers ALL 191, ALH 190, OL 200 and SCC 180. The program counter 192 is updated from registers AOL 201 and AOH 202 at a $\phi 2$ time. The execution and designation decodes are $\phi 1$ decodes from the IR 198. These decodes are strobed at $\phi 2$ time into SCC 180 to set up the ALU 181 and DESTINATION strobes which occur at $\phi 1$ time. The output signals of ALU 181 are strobed into DB 186, DO 187 or AOH 202 in accordance with the instruction being executed. Then ACL 183 and ACH 185 are updated at $\phi 2$ so another ALU 181 cycle can begin. It takes three processor cycles from the start of a fetch decode to the time that the accumulator 183, 185 is updated. A pipelined configuration means that in some cases a processor can be executing three separate instructions at the same time as is known in the computer arts.

INSTRUCTION SEQUENCES

An instruction sequence chart in FIGS. 5 & 6 is a convenient shorthand catalog of the internal operation of the processor 170 during each sequence of each instruction. It can be a very useful tool in understanding the processor's operation. This glossary of terms provides the information necessary for proper interpretation of these charts.

General Information

The processor 170 is pipelined. While it is executing one instruction, it reads the next two bytes from memory 172. The first byte is valid in IB 196 at the beginning of SEQ 1 and is used during SEQ 1 to provide three SEQ 1 decodes in SCC 180. At $\phi 1$, SEQ 1, IB→TR where it remains until the next $\phi 1$, SEQ 1. All remaining instruction decodes are done from IR 198.

The second byte is in TB 197 at the beginning of SEQ 2. This byte may contain immediate data for the current instruction or it may be a next instruction byte. If it is a next instruction byte, then the current instruction needs to read only one byte from memory to provide the required two bytes. This two byte read occurs for all one byte instructions.

All memory 172 accesses begin at $\phi 1$. The memory data is valid in the data latch register DL 205 via bus IO for CMP 170 by $\phi 2$, i.e., one and one-half instruction execution sequences later. In the table below, the memory timings for all instructions are set out together with the register destination (Dest) from data latch register 205.

WRITE—WRT

Indicates that a write into memory is initiated at $\phi 1$ rather than a read. A read is the default condition and requires no decodes. The WRT output line (FIG. 5) is active when WRT appears in the chart.

MEMORY REFERENCE TIMING TABLE

| | 1 | | 2 | | 3 | |
|---|---|---|---|---|---|---|
| INSTRUCTION | START | DEST | START | DEST | START | DEST |
| LR AR SR | 1 | TB | 2 | TB | 3 | TB |
| LRE LRD | 1 | ACL | 2 | ACL | 3 | TB |
| STR | 1 | TB | — | — | — | — |
| AI SI | 1 | TB | 2 | TB | — | — |
| CI GPI LI | | | | | | |
| XI OI NI | 1 | TB | 2 | TB | — | — |
| CB AB SB | | | | | | |
| LB XB OB | | | | | | |
| NB | 1 | TB | 2 | TB | 3 | TB |
| STB | 1 | TB | 3 | TB | — | — |
| AI SI SHL | | | | | | |
| SHR | 1 | TB | 2 | TB | | |
| TRA CLA | | | | | | |
| IC TBP TBR | 1 | TB | | | | |
| BAL | 1 | ACL | 2 | X | 5 | TB |
| RTN | 1 | TB | 2 | ACL | 3 | TB |
| | 4 | TB | | | | |
| Bφφ IJO | 1 | TB | 2 | TB | 3 | TB |
| $\overline{B\phi\phi}$ $\overline{IJO}$* | 1 | TB | 2 | TB | | |
| INTERRUPT | 1 | TB | 5 | ACL | 8 | TB |
| | 9 | TB | 10 | TB | | |
| BLI | 1 | TB | 2 | ACL | 3 | TB |
| | 4 | ACL | | | | |
| BSI | 1 | TB | 2 | ACL | 3 | TB |
| IN OUT | 1 | TB | 3 | ACL | 4 | TB |

*A bar over a jump or branch instruction indicates jump or branch was not taken.

| Code | Operation (Phase 2) | Decode |
|---|---|---|
| TB | DL→TB, ACL unchanged | None |
| ACL | DL→ACL, TB unchanged | TACL* or ITAL |
| X | None. ACL and TB are unchanged. Data will be lost unless SDL on line 206 is inhibited by DMA active on line 207. AND Circuit 208 blocks $\phi 2$ from generating SDL signals on line 206. DMA means direct memory access as by registers 173, 174. | NOTB* or TBNS |

If IR 198 still contains the current instruction byte, the decodes are static. If the decode is for the overlap cycle of SEQ 1 (with the next instruction byte in IR 198), the ALU 181 condition latches are set during the last sequences (3-5) of the current instruction execution. The designated register is decoded by SCC 180. This special case is shown on the instruction sequence charts, FIGS. 7 and 8, by the terms TBNS or ITAL in the ALU columns.

The operation of the processor 170 in each sequence is divided into two catagories: Control Logic (CL) of SCC 180 and ALU and Destination (ALU). The position of these two blocks within the sequence, (i.e., left half or right half) has no meaning. Operations can occur at $\phi 1$ or $\phi 2$ in either catagory. $\phi 1$ occurs in the middle of a sequence. The $\phi 2$ is always a sequence boundary.

Control Logic Glossary

This is a list of terms which appear in the control logic CL columns.

OUTPUT 1ST I/O—OUT 1IO

Indicates that the first cycle I/O code is placed on the output lines IO at $\phi 1$. Address lines AL9 and AL11 of ADC are driven by the decode IOCl. I/O line is active (FIG. 5).

OUTPUT 2ND I/O—OUT 2IO

Indicates that the second cycle I/O code is placed on the output lines IO to $\phi 1$. Address lines AL10 and AL11 of ADS are driven by IOC2. I/O line is active (FIG. 5).

TB→IB

At each $\phi 2$, SEQ 1 of every instruction, the signal contents of TB register 197 are transferred to IB register 196. Thee signal contents represent the next successive instruction following the current instruction.

IB SET

Same operation as TB→IB but the intent is to stop IB 196 from following TB 197 rather than to save the contents of the TB 197. It is followed at the next $\phi 1$ by IB SET TO "TRA".

IB SET TO "TRA"

Indicates that the reset inputs (not shown) on the IB 196 latches (not shown) are driven at $\phi 1$. CNT OR PORX drives an overlapping set on bits 0, 3, and 5, producing a "TRA" instruction code, BAL, POR then execute a TRA to complete their respective operations.

(TERM)

Indicates the end of the instruction. SEQ 1 begins at the doubled line 220 on the chart. The sequence counter (not shown S1-S6) in clock 176 is reset by the decode TERM*.

PCI

Indicates a read from memory and a Program Counter Increment. This action is a default condition and no decodes are needed.

φ1: PC+1→AO

φ2: AO→PC

PCNI

A "NO OP". Same as PCI except the PC 192 is not updated at φ2. The next PCI reads the same location again as though the first read did not occur. It is used because the processor lines signify something every φ1 and some instructions have no Read/Write or I/O requirements during SEQUENCE 1. SPC (Set PC) is inhibited for the jumps and branches, for the shift instructions, and for A1 and S1 instructions.

IBL, IRL, IRH

Indicates a memory access (read or write) to a register. IR (IB) means the register is specified by the low order four bits of IR (IB). IB must be used during SEQ 1. IR 198 is used during all other sequences. L means the access is to the low byte of the register, H specifies the high byte. The decode IRSL* (IR selected) controls the formation of the address at φ1.

| Operation | Control |
|---|---|
| IB(0—3)→AO(0-3) | IBX (SEQ 1 only) |
| IR(0-3)→AO(0-3) | IRX (all other sequences) |
| L=0, H=1→AO(4) | ILH |
| GP (0-2)→AO(5-7) | RGX |
| GP(3)→AO(8) | R3 |
| 0→AO(9-14) | TBIR |

TB

Indicates a memory access using the contents of TB 197 as the address. The decode TBSL* (TB selected) controls the formation of the memory address at φ1.

| Operation | Control |
|---|---|
| TB(0-7)→AO(0-7) | TBX |
| GP(3)→AO(8) | R3 |
| 0→AO(9-14) | TBIR |

IRL+8

Same as IRL except 1→AO(3). It is used only in the RTN instruction to read the new status from memory. A one is placed on AL(3)

CAL HIGH BITS, TB→AOL

Indicates a memory access to a location being branched to. The decodes TBSL* and AOSL* control address formation at Phase 1. The high bits are calculated by the counter logic CL for PCH+1 and PCH and by the ALU for PCH-1.

| | Operation | Control |
|---|---|---|
| Phase 1: | | |
| | TB(0-7)→AO(0-7) | TBX |
| | PCH+1→AO(8-14) | AOSL*=1, BNF=1 |
| | PCH→AO(8-14) | AOSL*=1, BNF=0 |
| | PCH−1→AO(8-14) | AOSL*=0 |
| Phase 2: | AO→PC | |

CAL HIGH BITS, IR→AOL

Similar to TB→AOL above except only the low four bits of the IR are used, and bits 4 through 7 are calculated by the counter logic. The decodes IRSL* and AOSL* control address formation by driving other control lines.

| | Operation | Control |
|---|---|---|
| Phase 1: | | |
| | IR(0-3)→AO(0-3) | IRX |
| | CL(4-7)→AO(4-7) | None (default) |
| | PCH+1→AO(8-14) | AOSL*=1, JF8=1 |
| | PCH→AO(8-14) | AOSL*=1, JF8=0 |
| | PCH−1→AO(8-14) | AOSL*=0 |
| Phase 2: | AO→PC | |

OL, OH, 4L, 4H, 8L, 8H, 12L, 12H

Indicates a memory access to a register directly specified by the control SCC 180. Occurs only during interrupt. L indicates the low byte, H indicates the high byte.

| | Operation | Control |
|---|---|---|
| Phase 1: | | |
| | Register→A(0-3) | CN2, CN3 |
| | L=0, H=1→AO(4) | ILH |
| | 0→AO(5-13) | TBIR |
| | 1→AO(14) | R9 |

Update PC, ACL→AOH, TB→AOL

Indicates a memory 172 access to an address specified by the contents of TB and ACL. The address is also placed in PC 192 at φ2. The address formation is controlled by AOTB* which drives other control lines. ACL 182 go through ALU 181.

| Operation | Control |
|---|---|
| Phase 1: | |
| TB(0-7)→AO(0-7) | TBX |
| ACL(0-6)→AO(8-14) | SAO |
| Phase 2: AO→PC | |

ACL→AOH, TB→AOL

Same as above except PC 92 is not updated at Phase 2.

Destination (Dest) Glossary

Items with boxes around them (e.g., ACL to DO→ACL) do not always occur. On Branch or Jump taken, the boxed destination occurs only when PCH 192B must be decremented to produce the proper address. The decrement always occurs, it but loaded only when it isn't needed. On all other instructions, the boxed destination occurs if the instruction is also boxed.

Items in parentheses are "don't care" conditions which occur but are not part of the desired operation.

There are seven standard data transfers:

| | Phase 1 | Phase 2 | Decodes |
|---|---|---|---|
| 1. | ALU→DO | — | None (Default) |
| 2. | ALU→DO | DO→ACL | BF3 |
| 3. | ALU→DB | — | DBDS* |
| | ACH→DO | — | |
| 4. | ALU→DB | DB→ACH | BF2 |
| | ACH→DO | DO→ACL | |
| 5. | ALU→AOH | — | AOTB* |
| | TB→AOL | DB→ACH | |
| | ACH→DO | DO→ACL | |
| 6. | PCL→DO | — | PCSL . PSX |
| 7. | STATUS→DO | — | STSL . PSX |

Any variations of these are decoded separately as exceptions.

MISCELLANEOUS OPERATIONS

Update Status

The new status (REG GROUP, EQ, CARRY, LOW, INT MASK) which has been read from memory replaces the old status.

| | Operation | Decode |
|---|---|---|
| (Phase 1) | TB→STATUS | UPST*, CHST, CHST* |
| (Phase 2) | — | |

Clear ACL & ACH

ACL 182 & ACH 185 are reset to zero by driving the reset inputs of the register latches (not shown).

| | | |
|---|---|---|
| (Phase 1) | — | |
| (Phase 2) | O→ACL, O→ACH | CLAC |

Processor Forced to Execute TRA

The IB 196 has been reset to a TRA instruction. The sequence counter (not shown) in clock 176 is reset to SEQ 1 and the processor executes the TRA before the next instruction from memory.

Interrupt is prevented from occurring until after the TRA is completed.

AC7*→EQ

The EQ indicator is set by AC7* (used by I/O instruction), the bit 7 of ACL 183.

IC SETS IC

The Input Carry instruction sets the IC latch (not shown) in ALU 181.

"32"→DO

1→DO(5). Part of POR code.

ALU GLOSSARY

This is a list of terms which appear in the ALU category.

X

ALU NO-OP. No ALU decodes are provided. ALU 181 output at 182 defaults to all 1's.

ACL±TB

ALU 181 output is either ACL plus TB 197 or ACL 183 minus TB 197 depending on whether instruction was an ADD or a SUBTRACT.

ACLxTB

ALU output is some logical combination of ACL and TB which is dependent on the actual instruction.

ACL

ALU output is ACL.

TB

ALU output is TB.

(MODIF)

ALU output is modified in some manner depending on the instruction. Example: On an IN or OUT instruction TB→DO except for bits 5 and 6 which are modified to reflect 0 and OUT respectively. ALU output is shown as TB (MODIF).

ACL INCR/DECR

ALU output is ACL plus 1 or ACL minus 1 depending on the instruction.

PCH−1

ALU output is PCH minus 1.

PCH−1+CR

Same as PCH-1 except carry is added.

TBNS, ITAL

ALU NO-OP. The destination of data signals entering the processor at the end of SEQUENCE 1 via register 105 must be specified by the previous instruction (although that instruction is no longer in the machine). To accomplish this action, two sets of latches are necessary. The ALU latches are used as the first set. The ALU latches drive the second set, TBNS and ITAL.

ITAL specifies the ACL as the destination. TBNS specifies no destination. The default condition (no decodes) specifies the TB as the destination.

CMP WORKING STORE 172 ADDRESSING

Either SMP 62 or CMP 170 can access working store 172 and input and output registers 173, 174. SMP 62 accesses the registers and working store 172, 173, 174 via MPC 65 as will be later described. As shown in the FIG. 7, the sixteen bit address for bus ADC is not completely used for accessing the registers in store 172 or the input/output registers 173, 174. Bit 12 of the CMP address space selects whether working store 172 or registers 173, 174 are accessed. When bit 12 is a binary 1, then registers 173, 174 are selected as represented by the I/O address space from addresses 4K to 8K. When bit 12 is a zero then the working store 172 address space from zero to 4K is selected. The least significant twelve bits select the address space within the two sections using known address decoding techniques. For the I/O address space, bits 3 through 11 select which I/O semiconductive chips constituting the input and output registers 173, 174 are selected, and bits 0 through 2 select bit positions within the chips forming the registers 73, 74 as will be later described. For working store 172, bits 0 through 11 designate continuous address space.

SMP 62 addressing accesses working store 172 and registers 173, 174 in two segments. With eight byte group fetching for each access, i.e., the SMP 62 command to MPC 65 minimum access is for eight bytes of signals in CMC 61. The first segment corresponds to the address space of working store 172 and the second segment corresponds to the address space for registers 173, 174. Selection of the first and second segments as well as the byte groups will be better understood from a reading of description of MPC 65. In the address space bits 0 to 7 of the ADS address bus from SMP 62 are used for controlling MPC 65. The upper four bits perform a device select and the lower four bits perform a command select which selects the segment and groups for initializing MPC 65 for data transfer. The address space shown in FIG. 7 for SMP 62 is for the first byte of a two-byte command as will become apparent.

Bus Controls

MPC 65 and bus select circuit 76 are both shown in FIG. 8. Bus select circuit 76 includes decoder 104 responding to signals from SMP 62 via control lines 103. Decoder 104 output signals in turn control a pair of AO circuits 105, 106 for selectively interconnecting the byte busses MI and DI and connecting page memory 64 to DI via AO 106. With these connections, SMP 62 completely controls the bus interconnections and hence the data flow in MPMC 15 under microcode or software control. The lines 103 include CWRT which, when active, indicates that SMP 62 is supplying signals to be written either in page memory 64 or to input/output. Line POR signifies that hardware circuits (not shown) are initiating a power on reset and that the bus connections are to be set up for initializing MPMC for operation. In general, POR control causes a write into page memory 64 from MI as received from NVS 19. ADS 12 signal line signifies that the cycle of SMP 62 is in the address cycle, i.e., a memory address is being sent to page memory 64. DMACY indicates that DMA 64A has access to page memory 64. $\phi$1XCC and $\phi$2DMAM are timing cycles corresponding, respectively, to $\phi 1$ and $\phi 2$ phases of the system clock. Additional gating for generating these signals is not shown for brevity. CHNSW carries a signal defining the time that data on DI is valid during system clock $\phi 2$. Lines INHDI and INHIO are special test control signals for testing the circuits and hence, are beyond scope of the present description.

Decoder 104 responds to the various lines 103 signals to actuate the AOs 105, 106 as described. The A1 input portion of AO 105 connects DI to MI in that the other inputs to the A1 input portion are DI and the output is directly connected to MI. Similarly, A2 input portion of AO 105 interconnects DI to MI under DMA memory access control. Additionally, decoder 104 detects from SMP 62 control signals that it is all right to connect to DI.

AO 106 selectively connects IOX from MPC 65 to MI or the output from page memory 64 to MI. The A1 input portion passes the IOX receive signal whenever the IO and in DI OK line from decoder 104 are active. Further, the A2 input portion is activated when decoder 104 signifies not IO, i.e., it is a memory reference.

With regard to the above statements, page memory 64 is continuously cycled and AO 106 selectively inhibits it outputs from bus DI during input operations, i.e., when signals from IOX are being transferred to MI.

MPC 65 is constructed using a similar design philosophy. Decode 110 responds to SMP 62 lines 103 signals as indicated in the drawing and to the ADS address signals to activate AND circuits 111 to pass signals from bus IO of CMC to cable IOX for gating by AO 106. Similarly, decode 112 responds to the SMP 62 control lines 103 signals and to the ADS signals to activate AND circuits 113 to pass the signals of bus DI to IO bus of CMC. In general, MPC 65 operates in two phases. The first phase is the addressing phase; the second phase is the data transfer phase. The address of the memory in CMC which includes ROS control store 171, working store 172, and registers 173, 174 is set forth in MPC register 114 at ADS 12 time from bus ADS. Additional control signals are supplied over DI. MPC register 114 supplies its output signals to bus ADC for addressing the above-mentioned modules in CMC. On the next and successive cycles, data is transferred through AND circuits 113 from DI to IO bus as indicated by the addresses supplied to ADC from MPC register 114.

MPC register 114 includes a control bit (not shown) that inhibits CMP 170 by supplying an inhibit signal over line 114A. This inhibit signal makes memory space of CMC 61 available to SMP 62 for exercising complete control, obtaining information, performing diagnostics and program loading.

The Print Mode

CPP 13 produces copies independent of the operational mode from the copy production machine 10, the mode differences being the selection of the image source as either SADF 11 or laser input LI 12B, and of the output portions 14B or 14A, 14C, respectively. Before printing, SMP 62 determines whether the machine is in the copy mode or the print mode. The characteristics of these two modes are first described. In the copy mode, which is a foreground operational mode, i.e., the one most readily available to an operator of the machine, SADF 11 supplies optical images to CPP 13 for production of copies to be deposited in either exit tray 14A or to be collated in output portion 14C. A feature of the copy mode is that all collation is done in the output portion and that the input optics scan an original document to be reproduced. Such scanning can be by the usual convenience copier optics, flying spot scanner, laser scanner, or any other form of scanning instrument. For example, the image on the document in SADF 11 may be scanned by a digitized scanner which converts the image into noncoded information (NCI) which in turn operates laser input LI 12B for reproducing the document via area 22 of photoconductor drum 20. The other mode, the print mode, selects word processing or data processing inputs in the form of image indicating signals normally stored in non-volatile store NVS 19. These signals are buffered in page memory 64 and interpreted at the laser input to generate images in accordance with the signal indications to produce what is termed "print copies" for deposit in output portion 14B. Reverser REV may be used in conjunction with duplex copy production for use in connection with either 14B or 14C as is well known in the arts. A distinguishing feature of the print mode from the copy mode as embodied in copy production machine 10 is that all collation of the images being produced in the print mode is done before the images are processed by photoconductor drum 20. This mode of operation may be conveniently termed precollation. Precollation is performed by manipulating the image indicating signals received from data processing or word processing input in such a manner that the print copies exit from CPP 13 in a proper collated order. In this manner, a single output at 14B receives fully collated copy sets in the print mode.

From the above, it is readily seen that in the copy mode there is a SADF 11 image source which shares the CPP 13 with other image sources yet has its own unique output portions 14A, C. In this manner, the copy mode and the print mode insofar as input and output are concerned are completely independent which facilitates sharing CPP 13 between the two modes of operation. Since the copy mode is the foreground mode, i.e., the most convenient mode insofar as operators are concerned, during a power on reset (POR) copy production machine 10 is initially selected to be in a copy mode. This copy mode is inactive whenever no copies are actually being produced by CPP 13 or being transported to output portions 14A, C. When the copy mode is inactive, a request from a data processor or a word processing station to print copies takes precedence, bringing the background print mode into a foreground operating state. Initiation of the print mode activity, taking it from a background state to a foreground operating state, is described shortly. The background print mode can be maintained in the foreground operating state until the copy mode is selected or until the print mode becomes inactive when the copy production machine 10 automatically reverts to the foreground copy mode. In the print mode, local terminal 16, nonvolatile store 19, and remote terminal connector 17 cooperate with MPMC 15 and LI 12B for producing print copies in CPP 13. A print mode request is initiated by an operator language called OCL (operator control language) which contains information enabling copy production machine 10 to produce a requested number of print copies in a predetermined format, also as defined by OCL. OCL language includes definitions of margins, font selection, tab stops, number of lines per page, and the like as is well known in the word processing industry. To initate a word processing input, word processing recorded magnetic cards are inserted into local terminal 16 hopper 137 such as a unit built by International Business Machines Corporation, Armonk, New York, and identified as a Magnetic Card Model II automatic typewriter. This recorder unit senses the word processing image indicating signals and transfers them under program control to memory 64 and SMP 62 performs word processing functions or text processing functions on the received image indicating signals. Such text processing functions are necessary to convert the word processing input into a textual format suitable for use by LI 12B. The details of such text processing become immensely complicated and are dispensed with for purposes of brevity, it being understood that known text processing techniques may be used for converting the received word processing image indicating signals to a format including control signals for use by the copy production machine 10. This mode continues until the hopper 137 of the local terminal 16 is empty. A switch (not shown) in hopper 137 signals to CMP 62 via DI bus that hopper 137 is empty. This signal signifies that all image indicating signals from word processing input LT 16 have been transferred into copy production machine 10. The hopper empty signal is transferred to SMP 62 for later use as will be described below.

Figure 9:
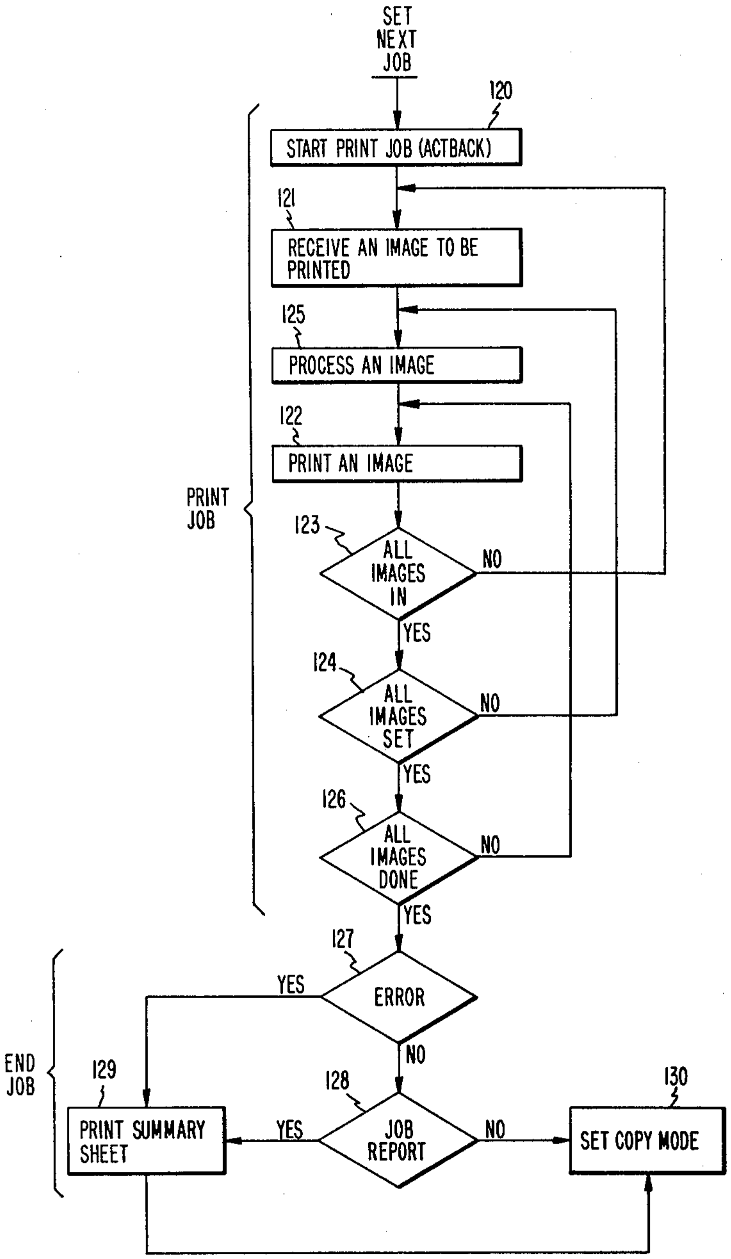
FIG. 9 is a flow chart illustrating a noninterrupted flow of a background print job and automatic reversion to the foreground copy mode.

The programming of SMP 62 in connection with the initiation of a print mode as requested by LT 16 receiving magnetic record cards (not shown) and actuation of "read" button 155 is shown in FIG. 9 and further explained with respect to the code listings included in the specification. It is to be understood that the supplied code listings are those necessary to provide the functions set forth in the claims and do not show all of the functions performed by SMP 62 in supervising the operating copy production machine 10. For example, text processing has been dispensed with as well as diagnostic and other supervisory functions usually performed by programmable computers in connection with controlling machines. Further, source code not necessary to an understanding of the claimed subject matter and which is interleaved with the listed codes has been omitted for purposes of more clearly describing the claimed invention.

Upon receipt of a print job initiating OCL, SMP 62 enters a start print job subroutine via a program path termed "set next job" which corresponds to memory address E874 in Table I below. The start print job at 120 is termed "ACTBACK" which is a shorthand name for activate background print mode. The details of ACTBACK 120 are shown in the Table I below in source code language operable on the above described pipeline processor. In Table I and all other source code tables in this specification, the left hand column entitled "LOC" indicates the actual memory location of the instruction word; "OBJ" is the object mode itself; the terms "OP1" and "OP2" refer to operands 1 and 2, respectively, and the source statement is the wide right hand column which defines the function being performed by the object code using operands 1 and 2.

MICROCODE TABLE I

ACTIVATE PRINT MODE

| LOC | OBJ | OP1 | OP2 | | | SOURCE STATEMENT | |
|---|---|---|---|---|---|---|---|
| E874 | EF | 000F | | ACTBACK | LR | STATER | |
| | | | | | EXP2 | NI,P(BDDSTF,DDSTF) | TEST 2 BITS-ZERO ALL OTHERS |
| E875 | AB88 | 0088 | | | | | |
| E877 | 46 | E886 | | | JE | NOTDRK | BOTH BITS = 0 |
| | | | | | EXP2 | XI,P(BDDSTF,DDSTF) | |
| E878 | AD88 | 0088 | | | | | |
| E87A | 3D91 | E891 | | | BE | DUPALT | BOTH BITS = 1 |
| E87C | EF | 000F | | | LR | STATER | STATE = 0/1 \| 1/0 |
| E87D | 97 | 0007 | | | TP | BDDSTF | |
| E87F | 61 | E811 | | | JNE | CDRK | |
| E87F | 96 | 0006 | | | TP | BLDSTF | |
| E880 | 6D | E88D | | | JNE | CLT | |
| | | | | CDRK | TSMR | FLCNTLR,P(CHNGDRKF) | FRGND LT, BCKGND DRK-SO CHANGE |
| E881 | E8 | 0008 | | | | | |

MICROCODE TABLE I-continued

ACTIVATE PRINT MODE

| | | | | | | |
|---|---|---|---|---|---|---|
| E882 | AF08 | 0008 | | | | |
| E884 | 88 | 0008 | *** | | | HARDWARE WILL TURN OFF LT DOC |
| E885 | 01 | E891 | | J | DUPALT | |
| E886 | EF | 000F | NOTDRK | LR | STATER | |
| | | | | EXP2 | NI,P(BLDSTF,LDSTF) | |
| E887 | AB44 | 0044 | | | | |
| E889 | 41 | E891 | | JE | DUPALT | BOTH = 0, NO CHANGE REQUIRED |
| | | | | EXP2 | XI,P(BLDSTF,LDSTF) | |
| E88A | AD44 | 0044 | | | | |
| E88C | 41 | E891 | | JE | DUPALT | BOTH = 1 SO NO CHANGE REQUIRED |
| | | | CLT | TSMR | FLCNTLR,P(CHNGLFT) | FRGND DRK, BCKGND LT-SO CHANGE |
| E88D | E8 | 0008 | | | | |
| E88E | AF04 | 0004 | | | | |
| E890 | 88 | 0008 | *** | | | HARDWARE WILL TURN OFF DARK DOC |
| | | E891 | DUPALT | DC | * | 1. SET UP DUPLEX FOR PRINT |
| E891 | EF | 000F | | LR | STATER | |
| | | | | EXP2 | NI,P(BDSTF,DSTF) | |
| E892 | AB11 | 0011 | | | | |
| E894 | 4C | E89C | | JE | GOOD1 | BOTH OFF SO NO CHANGE |
| | | | | EXP2 | XI,P(BDSTF,DSTF) | |
| E895 | AD11 | 0011 | | | | |
| E897 | 4C | E89C | | JE | GOOD1 | BOTH ARE ON NO CHANGE |
| | | | | TSMR | FLCNTLR,P(CHNGDUPE) | ONE OR THE OTHER IS ON |
| E898 | E8 | 0008 | | | | |
| E899 | AF01 | 0001 | | | | |
| E89B | 88 | 0008 | ** | | | SO TOGGLE STATE OF DUPLEX |
| | | | * | | | 1. SET UP SUPPLY BIN FOR PRINT |
| E89C | EF | 000F | GOOD1 | LR | STATER | |
| | | | | EXP2 | NI,P(BSSSTF,SSSTF) | |
| E89D | AB22 | 0022 | | | | |
| E89F | 47 | E8A7 | | JE | GOOD2 | BOTH ARE OFF-SO NO CHANGE |
| | | | | EXP2 | XI,P(BSSSTF,SSSTF) | |
| E8A0 | AD22 | 0022 | | | | |
| E8A2 | 47 | E8A7 | | JE | GOOD2 | BOTH ARE ON-SO NO CHANGE |
| | | | | TSMR | FLCNTLR,P(CHNGALTF) | ONLY ONE WAS ON-SO TOGGLE |
| E8A3 | E8 | 0008 | | | | |
| E8A4 | AF02 | 0002 | | | | |
| E8A6 | 88 | 0008 | | | | |
| | | | * | | | 1. RESET LIGHTS FOR NUM. PAGES & ADJUST |
| | | | GOOD2 | TRMR | LIGHTSR,P (ADJUSLTF,NUMPGLTF) | BYNOGKTF) |
| E8A7 | E9 | 0009 | | | | |
| E8A8 | AB9F | 009F | | | | |
| E8AA | 89 | 0009 | * | | | 1. SETUP ADJUST * NUMBER PAGES STATES (NUMPGF ADJUSTF) |
| | | | *C | | | |
| E8AB | A63F | 023F | | LBL | STATE1B | |
| | | | | EXP2 | NI,P(NUMPGF,ADJUSTF) | |
| E8AD | AB60 | 0060 | | | | |
| E8AF | A729 | 0229 | | OBL | $LITES2B | |
| E8B1 | A129 | 0229 | | STBL | $LITES2B | |
| | | | * | | | 1. RESTORE OLD STATES THIS CLEARS THE BACKGRND STATES |
| | | | *C | | | |
| E8B3 | 25 | | | CLA | *** | |
| E8B4 | A62F | 022F | | LBL | STATE2B | |
| | | | | SHRM | 4 | |
| E8B6 | 2F | | | | | |
| E8B7 | 2F | | | | | |
| E8B8 | 2F | | | | | |
| E8B9 | 2F | | | | | |
| E8BA | A12F | 022F | | STBL | STATE2B | |
| | | | * | | | 1. RESET READ AND RECEIVE FLASH (READFLF RECVFLF) |
| | | | *C | | | |
| | | | | TRMBL | $LITESFB,P (READFLF,RECVFLF) | |
| E8BC | A638 | 0038 | | LB | $REK874 | |

MICROCODE TABLE I-continued

ACTIVATE PRINT MODE

| | | | | | | |
|---|---|---|---|---|---|---|
| | | | | NI | X'FF'-($CA1875+$CA2875+ | |
| | | | | | $CA3875+$CA4875+$CA5875+$CA6875+$X | |
| E8BE | AB6F | 006F | | | CA7875+$CA8875) | |
| E8C0 | A138 | 0038 | | STB | $REK874 | |
| | | | * | | | 1. RESET COPY LIGHT (COPYLTF) |
| | | | | TRMBL | $LITES1B,P(COPYLTF) | |
| E8C2 | A639 | 0039 | | LB | $REK878 | |
| E8C4 | B6 | 0006 | | TR | COPYLTF | |
| E8C5 | A139 | 0039 | | STB | $REK878 | |
| | | | * | | | 1. SET COPIES REQUESTED= SETS REQUESTED |
| | | | *C | | | (CPYREQR = PRNTREQR) |
| E8C7 | E5 | 0005 | | LR | PRNTREQR | |
| E8C8 | 84 | 0004 | STR | CPYREQR | | |
| | | | * | | | 1. IF RECORD LIGHT IS ON SOLID |
| | | | *C | | | (RECRDLTF=1) |
| | | | * | | | 1. THEN |
| E8C9 | 97 | 0007 | | TP | RECREDLTF | |
| E8CA | 40 | E8D0 | | JE | XMIT | |
| | | | * | | | 2.. RESET RECORD FLASH (REDRDFLF) |
| | | | | TRMBL | $LITESFB,P(RECRDFLF) | |
| E8CB | A638 | 0038 | | LB | $REK880 | |
| E8CD | B1 | 0001 | | TR | RECRDFLF | |
| E8CE | A138 | 0038 | | STB | $REK880 | |
| | | | * | | | 1. ENDIF |
| | | | * | | | 1. IF TRANSMIT IS ON SOLID (XMITLTF=1) |
| | | | * | | | 1. THEN |
| E8D0 | A639 | 0239 | XMIT | LBL | $LITES1B | |
| E8D2 | 92 | 0002 | | TP | XMITLTF | |
| E8D3 | 49 | E8D9 | | JE | LGHTSGD | |
| | | | * | | | 2.. RESET TRANSMIT FLASH (XMITFLF) |
| | | | | TRMBL | $LITESFB,P(XMITFLF) | |
| E8D4 | A638 | 0038 | | LB | $REK882 | |
| E8D6 | B5 | 0005 | | TR | XMITFLF | |
| E8D7 | A138 | 0038 | | STB | $REK882 | |
| | | | * | | | 1. ENDIF |
| | | | * | | | 1. TURN DOCUMENT LAMT OFF (DOCLMPF=1) |
| | | | * | | | 1. SELECT PRINT EXIT POCKET (SELPRNTF=1) |
| | | | LGHTSGD | TSMR | FLCNTLR,P | |
| | | | | | SELPRNTF,DOCLMPF | |
| E8D9 | E8 | 0008 | | | | |
| E8DA | AF90 | 0090 | | | | |
| E8DC | 88 | 0009 | | | | |
| | | | * | | | 1. SET CHANGES ACTIVE FLAG (CHNGACTF) |
| | | | | TSMBL | STATE1B,P(CHNGACTF) | |
| E8DD | A63F | 003F | | LB | $REK887 | |
| | | | | OI | $CA1888+$CA2888+$CA3888+$CA4888+ | |
| | | | | | $CA5888+$CA6888+$CA7888+X | |
| E8E1 | A13F | 003F | | STB | $REK887 | |
| | | | * | | | 1. RESET INHIBIT PRINTING FLAG (PRNTINHF) |
| E8E3 | EC | 000C | | LR | SOFTJOBR | |
| E8E4 | B3 | 0003 | | TR | PRNTINHF | |
| E8E5 | A12C | 022C | STBL | JOBFLGB | | |
| | | | * | | | 1. SUBROUTINE EXIT |
| E8E7 | 21 | 0001 | ACTEND | RTN | BAL1 | |
| | | | * | | | ENDBEGIN ACTBACK |

In the above Table I the first part of the table shows SMP 62 readjusting the copy production machine 10 to accommodate the print mode, for example, the change from light or dark background copier settings to a normal setting. Also the duplex mode is selected if requested by OCL, such as at E891 memory address. The copy mode light is extinguished by an instruction at E8C2. The number of copies per set and the number of sets requested are set at by an instruction E8C7 and other controls incidental to effecting a print job are initialized in ACTBACK 120.

Next, copy production machine 10 receives an image to be printed as at 121. This image can be supplied through LT 16 or through RTC 17. In either event, the first image to be printed has to be received and placed in page memory 64 after suitable text processing (not described) effected via SMP 62. Once an image is in place in page memory 64, copy production machine proceeds to print an image at 122. Since steps 121 and 122 are a part of the print job and are not a part of the controls for switching between print jobs and copy jobs, the actual processing at the instruction level is dispensed with for purposes of brevity, it being understood that any suitable known text processing and image processing type of control may be used.

Upon printing an image as by imposing an image on photoconductor drum 22, and even before the imaged copy sheet has left fuser 31, SMP 62 checks to ensure that the print job is not over and determines the state thereof for determining the next action. FIG. 9 shows the overall view of how this is achieved while the details of it will be explained later with respect to FIG. 10. First, SMP 62 at 123 checks to see whether or not all images had been received. If not, SMP 62 actuates copy production machine 10 to receive another image to be printed. In this regard it should be noted that the images in page memory 64 may be transferred to nonvolatile store 19 in accordance with precollation techniques as will be later discussed. If all the images are in, i.e., LT 16 has completed its job or RTC 17 has completed its job, then SMP 16 determines whether or not all of the images are set as at 124. What this means is that all of the text processing has been performed by SMP 62 and that most of the image indicating signals had been stored in NVS 19. It should be understood that the image indicating signals per image are shuttled between page memory 64 and NVS 19 for printing successive precollated copies. If all of the images are not set, then SMP 16 returns to the first part of the program to process by text processing another image as at 125. It should be noted herein that before any image is printed, text processing functions are performed on it, no limitation thereto intended. If, on the other hand, all images had been text processed (set), SMP 62 then proceeds to check whether or not all of the images have been imaged on photoconductor drum 20, as at 126. If not, another image is printed. If all of the images had been impressed upon photoconductor drum 20, i.e., all copies have been started and all that remains is for copy production machine 10 to transport the imaged copy sheets to output portion 14. Then, no more imaging is performed and SMP 62 proceeds to terminate the print job.

In terminating a print job, SMP 62 first determines at 127 whether or not there were any error conditions occurring during the print job. If so, error conditions will be printed on a so-called summary sheet which is another imaged copy sheet supplied with the imaged print copies for use by the machine operator. Typically, a printed summary sheet would be text from NVS 19 and memory 64 containing error data and operational problems printed as a regular print copy in a predetermined format. Such summary sheets assist the operator in succesfully operating copy production machine 10 particularly when certain errors have occurred. A collection of such summary sheets is an efficient diagnostic aid to maintenance personnel for maintaining successful operation of copy production machine 10.

If there are no errors detected at 127, SMP 62 then proceeds to branch instruction at 128 to determine whether or not OCL initiating the print job had requested a job report in the form of a summary sheet. If so, copy production machine 10 prints the summary sheet indicating no errors and indicating parameters of the print job such as margin settings and the like.

SMP 62, after having determined the last printed copy sheet has successfully been transported to output portion 14B, sets the copy mode at 130. It should be noted herein that the summary sheet being printed at 129 does not start until SMP 62 has determined successful completion of the print job which includes depositing the last copy sheet successfully in output portion 14B. For purposes of simplicity, the wait loop necessary for SMP 62 to hold the print job summary sheet initiation is dispensed with because wait loops are well known.

Before the "set next job" can be performed as at 120 by SMP 62, it must verify that the copy mode switch 135 (FIG. 1B) has not been actuated. If actuated, a copy mode job will be performed. This determination is achieved in a three instruction subroutine shown below in Microcode Table II Sense Copy Mode Switch. This routine merely consists of an input instruction which receives the switch 135 setting via input registers 173 (FIG. 2) and then branches upon the input instruction to either set next job at 120 or perform copy mode operations (not herein described).

Further, the set copy mode 130 is shown in Microcode Table III Being Print Job End. If this microcode routine senses that the drive motor of the copy production machine which rotates photoconductor 20 is not being energized (drive low), which indicates an end of a print job has occurred, then SMP 62 executes branch instruction 128 to print summary sheet 129. After the summary sheet is printed, the copy mode will be reinstalled as an inactive foreground state. These actions are shown in Microcode Table III below.

MICROCODE TABLE II

SENSE COPY MODE SWITCH

| LOC | OBJ | OP1 | OP2 | | | SOURCE STATEMENT |
|---|---|---|---|---|---|---|
| 263 | A637 | 0237 | | NTCK | LBL | SWST3B |
| E26 | 92 | 0002 | | | TP | COPYSWF |
| E266 | 356E | E36E | | | BE | CHKINV |

MICROCODE TABLE III

BEGIN PRINT JOB END (PROJBEND)

| LOC | OBJ | OP1 | OP2 | | | SOURCE STATEMENT | |
|---|---|---|---|---|---|---|---|
| | | | | ** | | | BEGIN PRJOBEND |
| | | | | * | | | 1. IF DRIVE IS LOW & JOB END HAS OCCURRED |
| | | | | * | | | (DRIVESTF = 0 & JOBENDF = 1) |
| | | | | *XC | | | |
| DDEF | E7 | 0007 | | CHKPRJEN | LR | SWST2R | |
| DDF0 | 97 | 0007 | | | TP | DRIVESTF | |
| DDF1 | 346A | ED6A | | | BNF | ENDPJEND | |
| DDF3 | EC | 000C | | | LR | SOFTJOBR | |
| DDF4 | B5 | 0005 | | | TR | JOBENDF | |
| DDF5 | 356A | DE6A | | | BE | ENDPJEND | |

Figure 10:
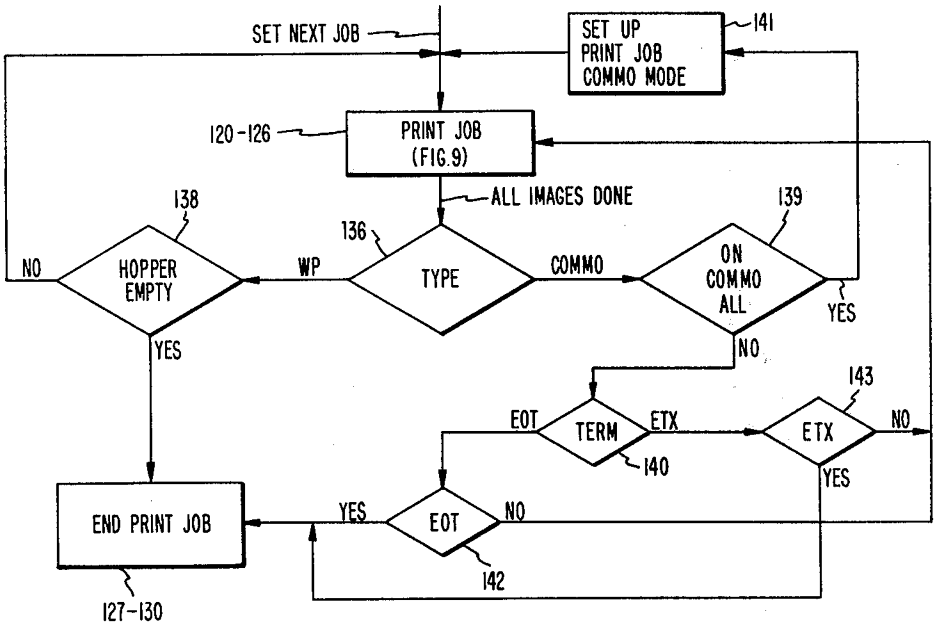
FIG. 10 is a flow chart detailing a job termination portion of the FIG. 9 flow chart.

As to SMP 62 terminating a print job, more detailed description of such termination is shown in FIG. 10. The print job control steps include items 120 through 126 of FIG. 9. When all the images are completed, the subroutine shown in FIG. 10 is entered at branch instruction 136, i.e., the FIG. 10 subroutine is interposed between branches 126 and 127 of FIG. 9. With different machine configurations, it is to be understood that the FIG. 10 subroutine would be changed accordingly.

SMP 62, having determined that all images are finished as at 126, then determines the type of image input at 136. If it is a word processing WP input from LT 16 then the LT 16, hopper 137 is checked to determine whether or not it is empty as at 138. If hopper 137 is not empty, the print job mode is left active. That is, in copy production machine 10, hopper 137 may receive a plurality of jobs to be automatically and successively printed. Each job would be started by a so-called OCL card which would specify the parameters of the print job to copy production machine 10. When a given print job from LT 16 is being completed it is necessary for the copy production machine 10 via SMP 62 to sense whether or not there are more jobs in hopper 137. If hopper 137 is empty, then the end print job routine of FIG. 9 which includes items 127–130 is entered including setting copy mode at 130.

On the other hand, if the images being printed are received via RTC 17 in the communications mode (COMMO), then the character of the job assignment must be examined by SMP 62. To this end, it first determines whether or not copy production machine has been placed in a dedicated receive mode, such as by the image sending remote station 18 via the OCL transmitted just prior to, during, or after the print job. On dedicated receive mode copy production machine 10 automatically sets up the next communication job at 141 and then automatically performs the printing in accordance with the received image-indicating signals. Accordingly, if copy production machine 10 is in the dedicated receive mode, then it must always set up a print job in the communication mode at 141. Code listings for the routine of 141 are omitted for brevity in that programmed reception of image-indicating signals are well known. Upon executing routine 141, SMP 62 then sets the next job via memory address B874 and starts printing again as soon as image-indicating signals are received, if any. In the dedicated recieve mode copy production machine 10 always has the print mode as the normal active foreground operational state. In the dedicated receive mode source 18 may typically be a data processing system 18A, 18B. In this instance, copy production machine 10 is a computer output peripheral interruptible to perform a manually actuated function in the computer peripheral.

If, on the other hand, copy production machine 10 is not in the dedicated receive mode (not on communication all of the time), it proceeds to determine what the image signal sending source 18 has indicated as a job termination. In accordance with known communication protocol, sessions, i.e., transmission periods, of sending image indicating signals to copy production machine 10, dictate that jobs can be ended by indicating end of text, ETX, or at end of transmission, EOT. Therefore, a branch at 140 determines the type of termination required by the sending source 18. If EOT, SMP 62 detects whether or not an EPT character has been received at 142. If not, the print job is then resumed; if yes, the print job is ended. Similarly, ETX branch 143 looks for the character ETX and performs the same functions as described for EOT.

The above portions of the print job are for uninterrupted print jobs, i.e., wherein a print job has been requested and the print mode has been changed from a background mode to a foreground operating state. The copy mode, which is a foreground operating mode, is relegated to the background operational state while the print mode is active. However, upon a request that a copy mode be instituted in copy production machine 10, the print mode is automatically relegated to a background operational state while the copy mode is activated into the foreground operational state until all copies have been made. At that point, the print mode is automatically reinstituted as the active foreground state as will become apparent from the immediately following description.

Copy Selection Interruption Point Control In Duplex and Simplex Printing

In either the simplex (single-sided printing) mode or the duplex (two-sided printing) mode copy production machine 10 can receive images via either local terminal 16 or remote terminal connector 17. In either instance, it is desired for throughput considerations to overlap the reception of imageindicating signals and text processing of those received image-indicating signals with the production of a first set of print copies to be made in accordance with received OCL instructions. Such overlapping and setting up is achieved as shown in steps 160 thru 167 of FIG. 11. In the production of subsequent print sets, all of the image signals have been processed and stored in NVS 19; hence, the procedure for printing subsequent print sets varies from that for printing the first print set as will become apparent.

In step 160, MPMC 15 interprets the OCL for setting up a print mode as shown for a duplex print mode. Step 160, in the event of receiving image-indicating signals from LT 16, is initiated when the read button switch 155 selects LT 16 as an input followed by closure of start button 180. Then MPMC 15 actuates LT 16 to read the word processing first card (not shown), previously inserted into inlet slot 137. The first card (not shown) contains OCL indicating signals which include the selection of the duplex mode (duplex mode may also be selected via panel 52, as well) as other parameters such as margins, line spacing, font style, and the like beyond the scope of the present description, In step 160, MPMC 15 decodes the received OCL signals and sends out instruction signals to the various portions of copy production machine 10 for implementing the received OCL. Once the OCL signals have been received, decoded, and copy production machine 10 set up for duplex printing operations, the machine is ready to read the second card (not shown) in the stack of cards (not shown) within slot 137. Reading a card (not shown) is performed at step 161 as receiving one image, i.e., one word processing card may correspond to one page of print, for example. Two such pages are on one copy sheet. Signals from the reader/recorder (not shown) of local terminal 16 are directed to page memory 64 under control of DMA 64A. Once the image-indicating signals are in page memory 64, the completion of the reading of one track or line of a word processing card (not shown), LT 16 signals SMP 62 to begin text processing. Once text processing is completed for the first or subsequent odd numbered pages it is printed as at 162. Simultaneously therewith or in sequence, depending on how one wants to construct the machine (in this particular instance, the printing occurs simultaneously with the reception of the second image signals at 163), the information is printed. For odd page printing in duplex mode D, CPP 13 transfers the print copy to interim storage unit (ISU) 40 whereas in the simplex mode S the print copy goes directly from CPP 13 to output portion 14B. In this regard, the interrupt point XS (interrupt during simplex mode) 164 indicates the print production interruption point enabling interruption of the simplex print mode by copy mode selection.

As soon as the steps 162 and 163 are completed, the second or subsequent even-numbered images received at 163, having been text processed, can be printed as even numbered pages in step 165. In both simplex and duplex print modes, the print copy goes to output portion 14B. This action represents completion of the printing of one more sheet of copy paper. At this point in time, the sheets of paper in the duplex mode sent to ISU have been retrieved and processed through CPP 13 to output protion 14B. Accordingly, CPP 13 has no interim-stored, partially-completed print copies. CPP 13 is available for interruption in the duplex mode as indicated by the symbol XS 166. Accordingly, during the print copy production of any first print set, copy selection interruption may occur at the completion of the printing of any sheet of paper.

In branch step 167, MPMC determines whether or not the last page of the print set has been received. For example, the OCL decoded in step 160 may contain information indicating that 92 pages are to be printed on 46 sheets of copy paper. In executing the OCL instruction, the number of pages are merely counted through the end of the print job. Steps 161 thru 165 are repeated until the last page has been received from LT 16 or RTC 17 and printed as the first print set, at which time step 168 is entered. This step is a wait step waiting for the first print set to be printed by CPP 13. In this regard, depending upon the error recovery or job recovery techniques employed with copy production machine 10, step 168 may be exited when the last sheet of paper of the first print set leaves CPP 13, the last sheet has been picked from ISU 40, or the last sheet has been finally deposited in output portion 14B. It is preferred that the MPMC 15 program control exits step 168 to begin the printing of the second and subsequent sets of print copies as soon as the last copy sheet has been deposited in output portion 14B. This selection simplifies automatic job recovery procedures.

It was stated earlier that the image indicating signals, as text processed by SMP 62, are stored in NVS 19. SMP 62 retrieves those stored image indicating signals in a predetermined order for insuring a proper collected set in output portion 14B. This collation is achieved by printing odd numbered pages first beginning with the highest odd numbered page and proceeding to the lowest odd numbered page. This production sequence of the odd numbered pages places the highest odd numbered page at the bottom of ISU 40 and the lowest odd numbered page as the top sheet in ISU 40. Then MPMC 15 actuates copy production machine to print the even numbered pages beginning with the lowest even numbered page. The first sheet picked from ISU 40 has the lowest odd numbered page. It also receives the lowest even numbered page. CPP 13 then deposits same in the bottom portion of output portion 14B, odd numbered page facing down. The second sheet contains the next highest odd numbered page, receives the next even numbered page, and is deposited on top of the previously printed page in output portion 14B, and so forth. Accordingly, the collated sets as stacked in output portion 14B have the lowest odd numbered page facing downward at the bottom of each print set and the highest even numbered page facing up on to of each print set. The general equation for this procedure is for even numbered pages, the page being printed at a given instant is 2(N-K), where N is the total number of sheets to be printed, and K is the number of completed printing cycles for even numbered pages, i.e., page number. In the case of odd numbered pages the page being printed is 2K+1 until the number of pages equals 2N-1 where K is the number of complete print cycles in printing odd numbered pages.

Figure 11:
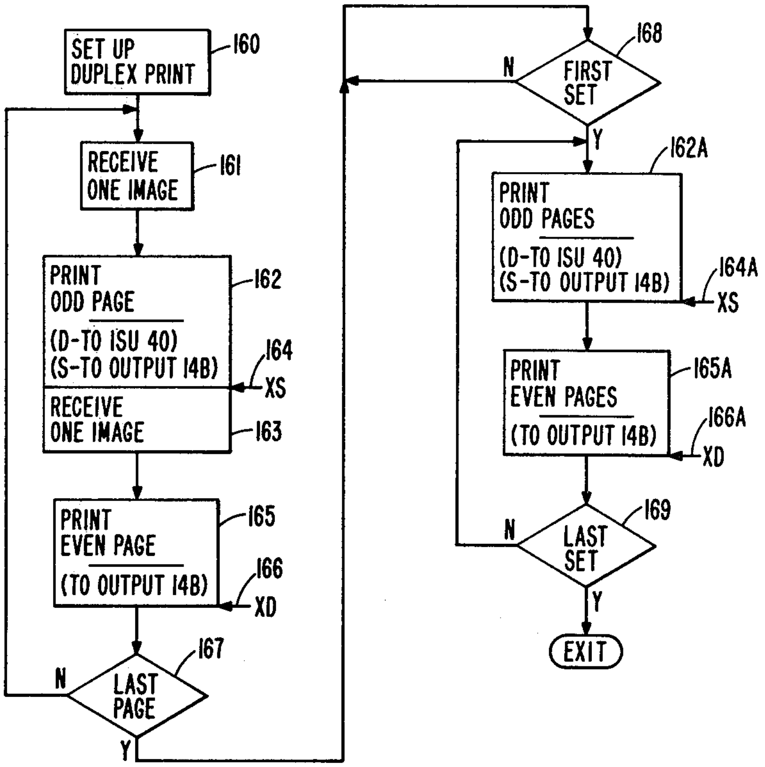
FIG. 11 is a flow chart showing copy selection interrupt of an active print mode in simplex and duplex copy printing operations with sheet and set copy interrupt synchronization points.

In FIG. 11 step 162A executed by SMP 62 actuates copy production machine 10 to print the odd numbered pages and supply same to ISU 40 as above described. Then, at step 165A copy production machine 10 prints the even numbered pages and supplies the printed pages to output portion 14B. Upon completion of step 165A, all print copies have been removed from CPP 13 and supplied to output portion 14B. At this point, CPP 13 is available for copy selection interrupt as indicated by the symbol XD 166A. At all other times during the execution of steps 162A and 165A, copies reside in ISU 40. Since a copy selection may employ the duplex mode and since ISU 40 is shared between the copy mode and the print mode, CPP 13 must be clear of copies prior to permitting copy mode interruption. Of course, in a simplex mode, completion of each page allows interruptions, such as at access 164A, i.e., copy mode interruption of the simplex print mode is at the end of each sheet.

From step 165A, SMP 62 enters branch step 169. In step 169, SMP 62 determines whether or not the last set has been successfully printed and supplied to output portion 14B. If not, steps 162A and 165A are repeated for printing successive sets. After the last set has been successfully printed, the program is exited and the copy mode is again set up as the inactive foreground mode as described above.

Copy Selection Interruption Timing Control

Figure 12:
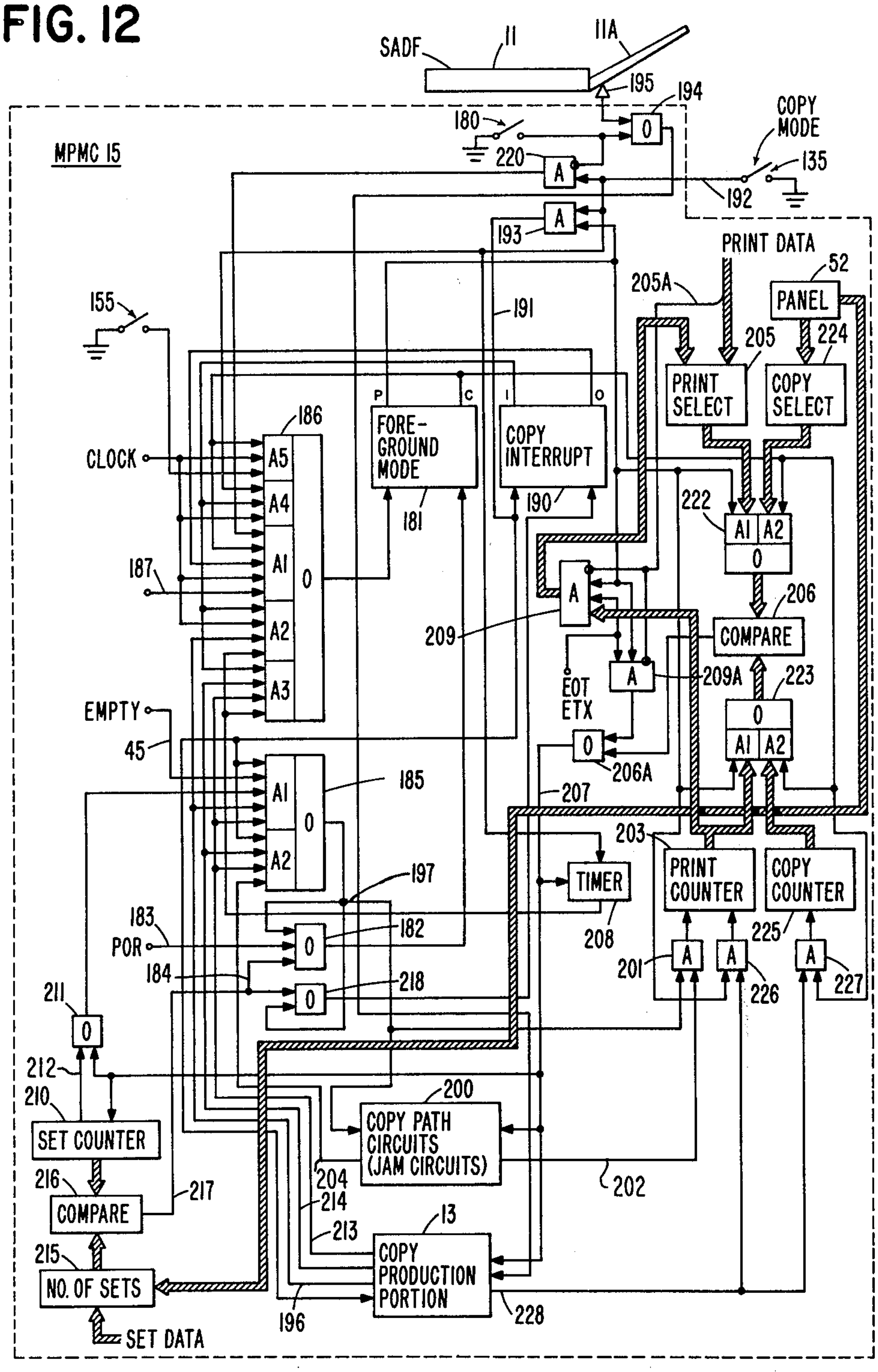
FIG. 12 is a diagram showing circuits for AND logic of print mode interrupt by a copy selection for maintaining print mode print copy count.

FIG. 12 illustrates the logic for determining when to interrupt the print mode. Auxiliary control logic for sequencing CPP 13 is not shown for simplifying the description and for making it more pertinent to the subject matter of the invention. The foreground mode is indicated by latch 181, the output P indicating print mode and output C indicating copy mode. Latch 181 is set to the C state via OR circuit 182 by the POR signal on line 183 during power on reset, upon completion of a print job by the signal on line 184 (and later explained), or by the output of AO (AND input, OR output) circuit 185 via line 197 for timing a copy selection interrupt. Latch 181 is set to the P state by AO circuit 186 at the end of a copy interrupt function or when the copy mode is inactive but still in the foreground state and a print request is received over line 187.

Copy interrupt latch 190 memorizes a copy selection interrupt request such that the illustrated circuits can force foreground mode latch 181 to the copy foreground state at the appropriate copy interrupt time. Copy interrupt latch 190 is set to the interrupt active state upon receiving a copy interrupt request signal over line 191. Such an interrupt signal can be generated in diverse ways. A copy interruption cycle is conditioned for activation by actuation of copy mode switch 135 which sets a memory latch (not shown) memorizing a single depression of the switch. Copy production machine 10 then becomes active in the copy mode. Start button 180 then can start actual copy production in the copy mode via OR circuit 194 which sends a copy request signal to CPP 13. Alternately, preentry switch 195 being actuated by an operator inserting a document into SADF 11 actuates copy production in the copy mode. Actuation of CPP 13 in the copy mode the same as Copier Series III is which is manufactured by International Business Machines Corporation, Armonk, N.Y. The above described control arrangement does not enable the operator to inhibit copy selection interruption of a print mode job. The copy mode is selected and must be deselected by timer 208 (later described) or terminated as described elsewhere. To enable operator override of the copy selection interrupt, a second depression of copy mode switch 135 can be made to reset the memory latch (not shown) removing the copy mode request selection.

When the copy mode is selected, an enabling signal travels over line 192 AND circuit (or interrupt detector) 193. AND circuit 193 is then enabled by the foreground mode latch 181 being in the P state. Copy interrupt latch 190 does not at that time actually interrupt copy production machine 10 print foreground mode. Actual timed interruption is determined by the logic of operations described below.

The copy selection interrupt can also be made dependent on OR circuit 194 indicating that the operator has readied the copy production machine 10 for copying. That is, the interrupt signal on line 191 would then be supplied by AND circuit 193 only when an output from OR circuit 194 indicates that start button 180 of panel 52 has been activated or the pre-entry switch 195 indicates a document resides in document tray 11A simultaneously with or after the copy mode switch 135 was activated and copy production machine 10 is in a print foreground mode. (This alternative is not shown in FIG. 13.)

In timing the interruption, AO circuit 185 responds to predetermined conditions to set foreground mode latch 181 to the copy state. The signal on line 191 goes to both the A1 and A2 AND circuit input portions of AO 185. The A1 input portion in one version interrupts the print mode when duplex has been selected in CPP 13 as indicated by a duplex signal on line 196 and ISU (Interim Storage Unit) 40 has switch 41 (FIG. 1B) supplying a signal over line 45 indicating whether or not a copy is in the storage unit. When switch 41 indicates ISU 40 is empty, the empty signal on line 45 completes the enablement of the A1 input portion for supplying a latch setting signal over line 197 and through OR circuit 182 setting foreground mode latch to the C state. It is also preferred that all copies made for a print mode job be clear of CPP 13 before copy selection interrupt can occur. Jam circuits 200 supply a "paper path clear" signal over line 204 to both A1 and A2 input portions of AO 185 for inhibiting the interrupt until the paper path (not shown) of CPP 13 is clear.

Simultaneously with the above described actions, the timed copy selection interrupt signal on line 197 conditions copy path or jam detection circuits 200 for handling the transition between the print mode and the copy mode. Further, the line 197 timed copy selection interruption signal conditions AND circuit 201 to pass any jam correcting signals from jam circuits 200 received over line 202. Since the present invention is not concerned with job recovery of a paper jam occurring at the transition between the print mode and the copy mode, the operation of AND circuit 201 is not further described. Print counter 203 contains a count indicating the number of sheets of paper picked from blank paper supply 35 (FIG. 1). If three sheets of print copies are lost because of a jam, then three is subtracted from the count in counter 203 via AND 201 for ensuring completion of the print job even under error conditions. Operation of counter 203 and the tally of copies produced will be described later.

In setting foreground mode latch 181 to the C state, the A1 input portion of AO 185 is also controlled by the copy production state in the duplex mode. In this regard the general counter control of copy production machine 10 for producing plural print sets will be described before the control of AO 185 is described. The number of pages to a print set may not be registered within copy production machine 10. Accordingly, during printing the first print set, the pages are counted in print counter 203, then transferred to print select register 205 when EOT or ETX (later described) signals indicate end of a print job set of print signals. AND circuits 209 respond to EOT/ETX in the print mode (latch 181 in P state) to pass the counter 203 signals. Simultaneously, AND circuit 209A passes the EOT-/ETX signal via OR circuit 206A as a later described end of set or complete signal on line 207. Alternatively, the AND gate 226 can be enabled by each received image set so as to provide a print select count based on the received signals instead of based on copies made in the first set as just described.

On the other hand, OCL could contain signals indicating the number of sheets in a print set. In such an instance, decoded print data is inserted into print select register 205 with a decoded inhibit signal supplied over line 205A to inhibit operation of AND circuits 209 and 209A. That is, OCL signals previously decoded by MPMC 15 may include print data signals stored in print select register 205 which indicates the number of pages to be produced in one print set, for example, as stated above, 92 pages were printed in a print set. These 92 pages require 46 sheets; therefore, print select register 205 is set to 92 for counting the pages. Such print data signals could be either from OCL or from the control panel 52.

Compare circuit 206 compares the signal contents of print select register 205 and print counter 203 to determine when one print set has been printed. Compare circuit 206 then emits a complete signal over line 207 to CPP 13, jam circuits 200, timer 208 (used in the copy mode), and to print set counter 210. The complete signal also travels through OR circuit 211 for completing enablement of the A1 input portion of AO 185 for setting foreground mode latch 181 to the C state thereby effecting interruption of the print mode when one print set been completed.

It will be remembered that during the production of the first set the completion of any even numbered image production enables a copy selection interrupt. In this regard, print-set counter 210 supplies its "count equal to one" signal over line 212 through OR circuit 211 to enable the A1 input portion of AO 185 during the production of the first print set enabling interruption after production of any even numbered print copies. Additionally, it is desired to have the interruption actually occur in the predetermined portion of a print copy cycle. This timing is determined by CPP 13 supplying a timing signal over line 213 to both the A1 and A2 input portions of AO 185. Such timing signal is emitted at a predetermined synchronous point in CPP 13 cycles of operation determined by the operational characteristics of copy production. Therefore, the signal supplied by AO 185 over line 197 is synchronous to the operation of CPP 13.

The copy selection interruption of a simplex print mode is achieved through the A2 input portion of AO 185. This interruption occurs when the signal from line 207, the timing signal on line 213, the line 191 copy select signal, and a simplex operation mode indicating signal on line 214 supplied by CPP 13 are all simultaneously active.

Termination of the print mode is determined by print set counter 210 reaching equality with the requested number of sets in print set selection register 215 previously set either from panel 52 or by MPMC 15 responding to OCL signals. When MPMC 15 detects no OCL print set count, register 215 is conditioned to receive panel 52 ten key count input as well known in the arts. Compare circuit 216 supplies a print mode terminating signal over line 217, thence to line 184 and OR circuit 182 for setting foreground mode latch 181 to the C state. Simultaneously, the line 217 print mode termination signal flows through OR circuit 218 resetting copy interrupt latch 190 to the zero, or noninterrupt, state. That is, since copy production machine 10 has been returned to the foreground copy mode, the copy interrupt latch should be in a noninterrupt mode.

AO circuit 186 sets foreground mode latch 181 to the print mode upon completion of the copy interrupt operation upon receiving a print request over line 187 when the copy mode is inactive or when copy mode (interrupt activated or otherwise) is overridden by operator selection. The copy mode being active is indicated by the C state of foreground mode latch 181 and copy interrupt latch 190 being reset and the output of AND circuit 220 indicating that start button 180 has not been actuated when copy mode switch 135 was selected. The A1 input portion of A0 186 then responds to a line 187 print request signal to set latch 181 to the P state.

The A2 and A3 input portions reset the copy mode to the print mode upon the termination of a copy selection interruption function. The A2 input portion responds to the duplex indicating signal received over line 196 from CPP 13. The copy interrupt latch active signal received from latch 190 indicating the copy mode was active because of a copy interrupt and the output of timer 208 to set the foreground mode latch 181 to the P state while resetting copy interrupt latch 190 to the noninterrupt state. A3 input portion to A0 186 performs the same function in the simplex mode. Deselection of the copy mode after an interrupt is detected by the A4 input portion of A0 186 for performing the same function. In this regard it may be noted that copy mode selection switch 135, when actuated in the copy mode, deselects the copy mode. During a copy mode run, switch 135 and start switch 180 are deactivated by circuits not shown. Actuating read switch 155 when the copy mode is the foreground mode (latch 181 is in the C state) actuates the A5 input portion of A0 186 to deselect the copy mode and activate the print mode. The read switch requests LT 16 to read a word processing card from slot 137. Therefore, such request is considered an operator override of copy mode selection including copy selection interrupt.

Compare circuit 206, which indicates the completion of a print set production, is also used in conjunction with copy production in the copy mode and the indication of the completion of a copy set. A difference between a print set and a copy set is that the print set contains a plurality of images corresponding to one complete set of original documents, while a copy set is a plurality of reproductions of the same image from one original document. A pair of AND/OR circuits 222 and 223 respectively, provide selection and copy count input to compare circuit 206. The A1 input portions of A0s 222 gate the signal contents of print select register 205 to compare circuit 206 when foreground mode latch 181 has been set to the P state. Similarly, the A1 input portions of A0s 223 gate the signal contents of print counter 203 to compare 206 during the print mode. Similarly, a panel 52 selection indicates to copy production machine 10 the number of copies to be produced in the copy run. Copy select register 224 memorizes the selection and supplies its signal contents through the A2 input portions of A0s 222 during the copy mode. Similarly, copy counter 225 counts the copies during the copy mode and supplies such copy count through the A2 input portions of A0s 223 to compare 206. Compare circuits 206 operate identically in both the print and copy modes.

The A2 input portions of A0s 222, 223 respond to the C state of foreground mode latch 181 for passing the above-described signals. Further, AND circuits 226, 227 respond respectively to the P and C states of latch 181 to pass the copy count indicating signals supplied over line 228 by CPP 13 to counters 203 and 225, respectively. Operation of these circuits is well known and not further described. Further, during the interrupt, the signal on line 191 may go to CPP 13 for inhibiting further paper picking until completion of print mode selection.

In a constructed embodiment of the invention, it is preferred that the logic of operations illustrated in FIG. 13 be performed by microcode in SMP 62 and CMP 170. In this regard SMP 62 contains programming corresponding to the operation of set control circuits 210, 215, 216, foreground mode latch 181, copy interrupt latch 190, as well as mode selections. CMP 170 contains programming for performing the functions represented by circuit elements 205, 224, 222, 206, 223, 203 and 225. Jam circuits 200 are preferably primarily known hardware circuits for performing the detection and jam control functions. With respect to jam recovery and job recovery it is preferred that the computer programming in SMP 62 cooperate with the computer programming in CMP 170 for effecting a complete job recovery. Such job recovery techniques are beyond the scope of the present description. Programming required to effect a programmed constructed embodiment of the present invention is believed to be well within the skill of the ordinary programmer who can understand the logical operations described with respect to FIG. 13. Such combination of programming and response of computer circuits to such computer programming or the illustrated hardware logic circuits is couched in terms of means plus a function in several of the apparatus claims.

From all of the above it is readily seen that the type of controls provided by the present invention in the utilization of CPP 13 for producing copies from diverse image sources results in a maximal utilization of the copy production machine during a so-called print mode. While a copy production machine has been illustrated as a transfer electrographic copy producer, no limitation thereto is intended. For example, so-called noncontact printing of the ink jet type may be equally employed with success; impact printers may also be used. Furthermore, while the invention has been described in the word processing environment, the use of image transfer such as facsimile, i.e., pictures, can be imposed on copy production machine 10 interleaved with text signals, all of the latter being determined by the construction of image generator 12C as well as the programming of MPMC 15 in controlling copy production machine 10.

It should also be noted that the termination of a local image input is based upon slot 137 sensing switch 238A indicating no more cards in recorder/reader 16M. Accordingly, recorder/reader 16M, when activated, can contain a plurality of actual print jobs and maintain reader/recorder 16M as the image source for image generator 12C throughout a succession of such jobs; for example, four OCL cards may be interposed in slot 137 such that four word processing print jobs can be automatically performed by copy production machine 10 in active succession. Furthermore, if a print job is being performed by copy production machine 10 and additional cards are added to slot 137, copy production machine 10 will then respond to those newly added cards before allowing modem 17M to receive text signals in a receive mode. Accordingly, remote control of copy production machine 10 via modem 17M can dedicate it to receiving remote image-indicating signals whereas the local terminal 16 can also be programmed via the insertion of cards in slot 137 for maintaining a dedicated print mode in copy production machine 10 for receiving locally generated images. On the other hand, recorder/reader 16M and copy production machine 10 may be programmed to respond to detecting an OCL card in slot 137 for sensing whether or not signals are to be received via modem 17M, thereby allowing a greater interleaving of images being received locally and remotely. However, it is believed that the arrangement shown in FIG. 14 wherein hopper or slot 137 may be empty of cards is a convenient control mechanism for copy production machine 10 in that all local jobs are grouped together in output portion 14B whereas all remote generated jobs received via modem 17M are also grouped together in output portion 14B.

In the duplex print mode, SMP 62 is preferably programmed so that the number of print set pages is always even. For an odd number of received images (in the physical form of image-indicating signals), an additional page (blank) is added to the odd-numbered page duplex print set. Instead of printing the last image as a blank page, CPP 13 can be constrained in operation so that photoconductor drum 20 receives no toner ink, i.e., CPP 13 operates in a so-called dummy or no transfer cycle for keeping the last page blank.

There is no copy production machine control over the number of pages to be included in a print set. Copy production machine 10 has interim storage unit 40 used in the duplex print mode. The finite capacity of this unit could be exceeded in any given print set. When this situation arises, the print job is automatically divided into parts determined by the capacity of interim storage unit 40. For example, when interim storage unit 40 has a capacity of 100 sheets, each 500 page (250 sheets) print job for 43 print sets is handled as follows. NVS 19 receives the first 200 pages of the print job as described in steps 121–126 of FIG. 9. When 200 images (100 sheets of printing in duplex print mode) have been received, RTC 17 or LT 16, as appropriate, is put in a hold status while LI 12B and CPP 13 print the first 100 sheets of all 43 print sets and supply same to output portion 14B. Then, SMP 62 under program control automatically restarts RTC 17 or LT 16 to receive the next 200 images. Then RTC 17/LT 16 is again put on hold while LI 12B and CPP 13 supply the next 100 sheets of duplex copies to output portion 14B. The last 50 sheets of 100 images are handled in a like manner, all as shown in FIG. 9, except for the automatic job requesting to accommodate limited capacity of copy production machine 10 while automatically performing a complete print job having a requirement exceeding the capacity of copy production machine 10. The same technique is employed when the capacity of NVS 19 fills up with a partial print job image-indicating signals.

In the event blank paper supply 35 becomes empty, all print operations of copy production machine 10 cease. In the print mode, it is preferred that the receipt of image-indicating signals may continue until page memory 64 is filled or 200 images have been received. Alternately, receipt of image-indicating signals may also be interrupted.

While the invention has been particularly shown and described with reference to preferred embodimdents thereof, it will be understood by those skilled in the art that various changes in form and details may be made therein without departing from the spirit and scope of the invention.

What is claimed is:

1. The method of operating a copy production machine adapted to produce copies in response to received image sets of image-indicating signals for producing a predetermined number of copy sets on a plurality of copy sheets;

the steps of:

(1) receiving and storing in a memory one image set of image-indicating signals;

(2) producing one image on a first side of a copy sheet based on said one image set of image-indicating signals;

(3) receiving and storing in a memory a second image set of image-indicating signals;

(4) producing one image on a second side of a copy sheet based upon said second set of image-indicating signals;

(5) supplying said imaged copy sheet to an output receptacle as a completed copy sheet;

(6) repeating steps (1–5) until all image sets of image-indicating signals have been received and stored and one collated copy set of completed copies has been supplied to said output receptacle; and (7) fetching said stored image sets of image-indicating signals from said memory for printing all remaining collated copy sets to be printed up to said predetermined number of collated copy sets.

2. The method set forth in claim 1 further including the steps of:

storing all single-imaged copy sheets in said machine in the order produced, storing only one of such single-imaged copy sheet at a time while producing said first collated copy set while storing all single-imaged copy sheets for each said subsequent collated copy set, and fetching said stored single-imaged copy sheets and printing an image on a second side thereof based on said second image sets respectively.

3. The method set forth in claim 2 including the steps of:

producing said first collated copy set in the order of receipt of said image sets, pairs of said received image sets being applied to image production on opposite sides of copy sheets, respectively; and producing subsequent collated copy sets in a sequence of image sets different from said order of received image sets.

4. The method set forth in claim 1 further including the steps of:

counting said image sets as received during production of said first collated copy set; and indicating said count as the number of image sets to be used in the production of subsequent collated copy sets.

5. The method set forth in claim 4 further including indicating a count of collated copy sets to be produced before indicating the number of image sets to be used in producing said subsequent collated copy sets.

6. The method set forth in claim 5 wherein said memory has a predetermined capacity to store said image sets, comprising the steps of:

limiting production of image sets for each said collated copy sets in accordance with said memory capacity, whereby certain of said collated copy sets are producible as a plurality of collated copy set segments;

producing a first of said collated copy set segments; and repeating steps (1) through (7) for each subsequent one of collated copy set segments for producing said indicated number of collated copy sets of each said collated copy set segments.

7. The method set forth in claim 1 further including the steps of:

successively selecting a source of said image sets of image-indicating signals from diverse image set sources; and repeating steps (1) through (7) independently for each of said diverse image set sources.

8. The method set forth in claim 1 further including the steps of performing steps (1) and (2) for odd numbered pages and steps (3) and (4) for even numbered pages.

9. The method of operating a copy production machine adapted to produce print copies in collated copy sets and bearing images produced in accordance with image sets of image-indicating electrical signals comprising the steps of:

indicating the number of collated copy sets to be produced;

receiving image sets of image-indicating electrical signals for producing said collated copy sets;

counting said received image sets while receiving same for indicating the number of pages in each of said collated copy sets to be produced;

storing said received image sets as received; and producing said indicating number of collated copy sets in accordance with received image sets and said count including producing a predetermined number of collated copy sets from said stored image sets.

10. The method set forth in claim 9 further including producing at least a part of a first of said collated copy sets while receiving said image sets and producing said indicated number less one of collated copy sets in accordance with said stored image sets.

11. The method of operating a copy production machine adapted to make collated copy sets, comprising the steps of:

indicating a number of collated copy sets to be produced;

producing a first one of said sets without knowing the number of copies in each of said collated copy sets to be produced, said first set being terminated by a delimiter;

counting the copies required to produce said first set; and producing said indicated number less one of said collated copy sets including the steps of (1) accumulating the number of copies produced, (2) comparing the accumulated number produced with said copy count made during the production of said first collated copy set, (3) decrementing said indicated number whenever said accumulated number and said copy count are equal, (4) resetting the accumulated number whenever said indicated number is decremented, and (5) repeating steps (1)-(4) until said indicated number is decremented to a value indicating all said collated copy sets have been produced.

12. A copy production machine having a copy production portion for producing print copies bearing images in accordance with received image sets of image-indicating signals, means for receiving completed imaged copy sheets in collated sequence, the improvement including in combination:

means for receiving image sets of image-indicating signals;

means for storing said received image sets of image-indicating signals;

means for supplying image sets of image-indicating signals to said copy production portion;

a control computer connected to all said means for operating same in accordance with a program of instructions;

a program memory connected to said control computer and containing programs of instruction signals for enabling said control computer to operate all of said means in accordance with the following program denominated functions:

(1) receive and store in said means for storing one image set of image-indicating signals;

(2) produce one image on a first side of a copy sheet based on said one image set of image-indicating signals;

(3) receive and store in said means for storing a second image set of image-indicating signals;

(4) produce one image on a second side of a copy sheet based upon said second set of image-indicating signals;

(5) supply said imaged copy sheet to an output receptacle as a completed sheet;

(6) repeat steps (1-5) until all image sets of image-indicating signals have been received and stored and one collated copy set of completed copies has been supplied to said output receptacle; and (7) fetch said stored image sets of image-indicating signals from said means for storing for printing all remaining collated copy sets to be printed up to said predetermined number of collated copy sets.

13. The copy production machine set forth in claim 12 further including in said means for receiving a plurality of diverse means each for receiving image sets from diverse sources, and said control computer operating all said means in accordance with said programs of instruction signals independent of which of said diverse means is receiving said image sets.

14. The method of operating a copy production machine adapted to produce copies in response to received image sets of image-indicating signals for producing a predetermined number of copy sets on a plurality of copy sheets;

the steps of:

(1) receiving and storing in a memory one image set of image-indicating signals;

(2) producing one image on a copy sheet based on said one image set of image-indicating signals;

(3) supplying said imaged copy sheet to an output receptacle as a completed copy sheet;

(4) repeating steps (1-3) until all image sets of image-indicating signals have been received and stored and one collated copy set of completed copies has been supplied to said output receptacle; and (5) fetching said stored image sets of image-indicating signals from said memory for printing all remaining collated copy sets to be printed up to said predetermined number of collated copy sets.

15. The method of claim 14 further including the steps of:

processing said received image signals in a digital computer before storing and producing an image on a copy sheet.

16. The method of claim 15 wherein said processing includes text processing for adapting the received signals to said copy production machine.

17. The method of operating a copy production machine set forth in claim 14, further including the steps of:

(6) indicating the number of collated copy sets to be produced;

(7) counting said received image sets while receiving same for indicating the number of pages in each of said collated copy sets to be produced; and (8) producing said indicated number of collated copy sets in accordance with received image set and said image count including producing a predetermined number of collated copy sets from said stored image sets.

18. The method set forth in claim 17 further including the steps of:

temporarily storing each of said received image sets in a first electronic memory;

producing an image in accordance with image set stored in said first memory for said first one of said collated copy sets and storing said temporarily stored image set in another memory for later fetching to produce said predetermined number of collated copy sets less one.

19. The method of operating a copy production machine having means for receiving electrical image-indicating signals, comprising the steps of:

receiving and printing in substantially real time a first collated set of images, storing said received signals as printing ensues, and fetching said stored signals to print additional collated sets in a batch off-line mode wherein said machine is disconnected so as not to receive more of said image-indicating signals representing images to be printed in said collated sets.

20. A copy production machine having a copy production portion for producing print copies bearing images in accordance with received image sets of image-indicating signals, means for receiving completed imaged copy sheets in collated sequence, the improvement including in combination:

means for receiving image sets of image-indicating signals;

means for storing said received image sets of image-indicating signals;

means for supplying image sets of image-indicating signals to said copy production portion;

a control computer connected to all said means for operating same in accordance with a program of instructions;

a program memory connected to said control computer and containing programs of instruction signals for enabling said control computer to operate all of said means in accordance with the following program denominated functions:

(1) receive and store in said means for storing one image set of image-indicating signals;

(2) produce one image on a first side of a copy sheet based on said one image set of image-indicating signals;

(3) supply said imaged copy sheet to an output receptacle as a completed sheet;

(4) repeat steps (1-3) until all image sets of image-indicating signals have been received and stored and one collated copy set of completed copies has been supplied to said output receptacle; and (5) fetch said stored image sets of image-indicating signals from said means for storing for printing all remaining collated copy sets to be printed up to said predetermined number of collated copy sets.

21. The method of operating a copy production machine adapted to produce copies in response to received image sets of image-indicating signals for producing a predetermined number of copy sets on a plurality of copy sheets;

the steps of:

(1) receiving and storing in a memory one image set of image-indicating signals;

(2) producing one image on a copy sheet based on said one image set of image-indicating signals;

(3) supplying said imaged copy sheet to an output receptacle as a completed copy sheet; and (4) repeating steps (1-3) until all image sets of image-indicating signals have been received and stored and one collated copy set of completed copies has been supplied to said output receptacle whereby said stored image sets of image-indicating signals are available for subsequent printing.

* * * * *